United States Patent
Yamamoto et al.

(10) Patent No.: US 7,739,793 B2
(45) Date of Patent: Jun. 22, 2010

(54) METHOD OF MANUFACTURING RACK GUIDE BASE BODY IN RACK-AND-PINION TYPE STEERING APPARATUS AND RACK GUIDE

(75) Inventors: Kazuhiro Yamamoto, Ritto (JP); Masao Shimura, Osaka (JP); Yoshiro Kuzumi, Kanagawa (JP); Masahiko Hirose, Osaka (JP); Masaaki Hashimoto, Osaka (JP); Takahiro Tanaka, Osaka (JP); Katsutoshi Nishimura, Osaka (JP)

(73) Assignees: JTekt Corporation, Osaka (JP); Oiles Corporation, Tokyo (JP)

( * ) Notice: Subject to any disclaimer, the term of this patent is extended or adjusted under 35 U.S.C. 154(b) by 860 days.

(21) Appl. No.: 11/587,954

(22) PCT Filed: Apr. 26, 2005

(86) PCT No.: PCT/JP2005/007940
§ 371 (c)(1),
(2), (4) Date: Dec. 13, 2006

(87) PCT Pub. No.: WO2005/105344
PCT Pub. Date: Nov. 10, 2005

(65) Prior Publication Data
US 2007/0228682 A1    Oct. 4, 2007

(30) Foreign Application Priority Data
Apr. 30, 2004    (JP) .............................. 2004-136775

(51) Int. Cl.
B21D 53/28    (2006.01)
F16H 1/04    (2006.01)
(52) U.S. Cl. .................. 29/893.34; 29/527.5; 29/527.6; 74/422
(58) Field of Classification Search .............. 29/893.34, 29/893.3, 527.1, 527.5, 527.6; 74/409, 422, 74/492; 180/427; 280/267
See application file for complete search history.

(56) References Cited

U.S. PATENT DOCUMENTS

| | | | | |
|---|---|---|---|---|
| 5,746,285 A | * | 5/1998 | Yonezawa | 180/428 |
| 5,937,703 A | * | 8/1999 | Engler | 74/498 |
| 6,076,417 A | * | 6/2000 | Engler | 74/388 PS |
| 6,178,843 B1 | | 1/2001 | Machida et al. | |

(Continued)

FOREIGN PATENT DOCUMENTS
DE    100 14 336 A1    10/2001

(Continued)

OTHER PUBLICATIONS

International Search Report of PCT/JP2005/007940 date mailed Aug. 30, 2005.

*Primary Examiner*—David P Bryant
*Assistant Examiner*—Ryan J Walters
(74) *Attorney, Agent, or Firm*—Nixon & Vanderhye P.C.

(57) ABSTRACT

A method of manufacturing a rack guide base body wherein a cavity (40) is formed which has a pair of semicylindrical convex surfaces (44a and 44b) and a pair of flat surfaces (45) each located between the semicylindrical convex surfaces (44a and 44b), and has a recessed surface (41) located on one axial end portion side inwardly of the semicylindrical convex surfaces (44a and 44b) and the flat surfaces (45) and a cylindrical surface (42) located on the other axial end portion side inwardly of the semicylindrical convex surfaces (44a and 44b) and the flat surfaces (45); a hollow portion (9c) is formed for allowing the cavity (40) to communicate with a hollow portion (10c) at one flat surface (45) and with a hollow portion (8c) at the other flat surface (45); a rack guide base body (50) is die cast by forcing molten metal of aluminum from the hollow portion (10c) into the cavity (40); and runners (56) integrally joined to flat surfaces (55) of the rack guide base body (50) formed by the respective flat surfaces (45) are cut off.

13 Claims, 16 Drawing Sheets

U.S. PATENT DOCUMENTS

| | | | |
|---|---|---|---|
| 6,539,821 B2 * | 4/2003 | Bugosh | 74/422 |
| 6,619,420 B1 * | 9/2003 | Saarinen | 180/428 |
| 6,921,096 B2 * | 7/2005 | Yang | 280/93.514 |
| 7,275,456 B2 * | 10/2007 | Yamamoto et al. | 74/422 |
| 2002/0124670 A1 | 9/2002 | Bugosh | |
| 2006/0042849 A1 | 3/2006 | Yamamoto et al. | |

FOREIGN PATENT DOCUMENTS

| | | |
|---|---|---|
| EP | 1 086 880 A | 3/2001 |
| EP | 1577035 A1 | 9/2005 |
| JP | 02 046452 Y2 | 12/1990 |
| JP | 02-046452 Y2 | 12/1990 |
| JP | 06-239245 | 8/1994 |
| JP | 07-323850 | 12/1995 |
| JP | 08-133099 | 5/1996 |
| JP | 2000-142428 | 5/2000 |
| JP | 2005-47301 A | 2/2005 |
| WO | WO 2004/045790 A1 | 6/2004 |

\* cited by examiner (a)

(b)

(a)

(b)

(a)

(b)

METHOD OF MANUFACTURING RACK GUIDE BASE BODY IN RACK-AND-PINION TYPE STEERING APPARATUS AND RACK GUIDE

This application is the US national phase of international application PCT/JP2005/007940, filed 26 Apr. 2005, which designated the U.S. and claims priority of JP2004-136775, filed 30 Apr. 2004, the entire contents of each of which are hereby incorporated by reference.

TECHNICAL FIELD

The present invention relates to a rack-and-pinion type steering apparatus.

BACKGROUND ART

Patent document 1: JP-A-50-102027
Patent document 2: JP-UM-B-1-27495
Patent document 3: JP-UM-B-2-46452

A rack-and-pinion type steering apparatus is generally comprised of a housing, a pinion rotatably supported by this housing, a rack bar on which rack teeth meshing with this pinion are formed, a rack guide disposed in a housing to slidably support the rack bar, and a spring for pressing this rack guide toward the rack bar.

In such a rack-and-pinion type steering apparatus, an iron-based sintered metal or a synthetic resin is used for the rack guide for slidably supporting the rack bar. However, in the case of the rack guide formed of an iron-based sintered metal, although it has sufficient mechanical strength against an impact load from the rack bar, the efficiency of a steering system declines since the frictional resistance to sliding is large, so that a problem remains in controllability. Meanwhile, as for the rack guide formed of a simple substance of synthetic resin, although it is conversely capable of reducing the frictional resistance to sliding, the following problems are encountered among others: It is inferior in mechanical strength against an impact load. It undergoes variations in dimensions due to such as die shrinkage, and it is difficult to effect molding with high dimensional accuracy and maintain the dimensional accuracy after molding. Furthermore, after it is built into the housing, it is subjected to the effect of the temperature rise of the steering apparatus and undergoes thermal expansion and shrinkage, which causes thermal deformation and creep, making it difficult to slidingly support the rack bar smoothly.

In the rack guide formed of a simple substance of synthetic resin having these problems, techniques have been proposed in which a reinforcing material constituted by a core bar is insert molded or embedded in a main body made of a synthetic resin particularly for the purpose of improving the mechanical strength against an impact load (disclosed in JP-UM-B-59-8932 and JP-UM-A-58-139275). However, with these techniques as well, the problem of the dimensional accuracy attributable to the die shrinkage of the synthetic resin and problems such as the thermal expansion, shrinkage, thermal deformation, and creep (plastic flow) of the synthetic resin ascribable to the temperature rise of the steering apparatus still remain unresolved.

As rack guides which overcome the above-described problems, rack guides have been proposed in which a slider made of a synthetic resin having self-lubricating properties and abrasion resistance on its sliding surface side for slidingly supporting the rack bar, or a slider made of a multilayered material of a three-layered structure consisting of a steel sheet, a metal sintered layer deposited integrally on this steel sheet, and a synthetic resin layer impregnating and coated on this sintered layer, is combined with a rack guide base body formed of a metal such as a sintered metal or a synthetic resin containing a reinforcing filler (disclosed in JP-A-50-102027, JP-UM-B-1-27495 and JP-UM-B-2-46452).

In comparison with the rack guide mentioned before, the above-described rack guide formed by the combination of the slider and the rack guide base body has advantages in that the mechanical strength is enhanced, and that the frictional resistance to sliding is reduced.

In the rack guide formed by the combination of the slider and the rack guide base body having the above-described advantages, particularly in a case where aluminum or an aluminum alloy is used for the rack guide base body, a problem in its manufacture has been presented. Namely, in the case where the rack guide base body is fabricated from aluminum or an aluminum alloy, the die casting process is generally adopted. According to this die casting process, molten metal of aluminum or an aluminum alloy is passed through a runner channel from a gate and is forced into a cavity formed in the shape of the rack guide base body. At that time, however, the formation of runners at the junction between the runner channel and the cavity and the junction between the cavity and an overflow well is made inevitable. Then, as these runners are cut off, the rack guide base body is formed.

Incidentally, since the gap between the rack guide with a circular cross section and the cylindrical housing of the rack-and-pinion type steering apparatus in which the rack guide is disposed is set to be 1 to 20 μm, even after the aforementioned runners are cut off, the presence of projecting portions as cut remnants of the gate is made inevitable on the outer peripheral surface of the rack guide base body. Accordingly, with the rack guide base body on the outer peripheral surface of which the projecting portions remain, there is a problem in that unless the entire outer peripheral surface of the base body is subjected to machining, the rack guide cannot be disposed in the cylindrical housing. This constitutes a factor leading to higher cost due to the machining of the entire surface. The same holds true of a case where zinc or a zinc alloy is used as the molten metal.

In addition, a die and movable dies, which are inserted into the die to form a cavity corresponding to the shape of the rack guide base body in cooperation with the die, are used in die casting. However, in order to ensure that unnecessary gaps will not be produced between the die and the movable dies by causing the movable dies to be fitted closely in the die, it is inevitable to fabricate the die and the movable dies very accurately so as to be free of errors. However, the fabrication of the die and the movable dies with such high accuracy leads to higher cost, and even if it was possible to fabricate the die and the movable dies with high accuracy, there is a possibility that very small gaps remain at boundaries between the die and the movable dies.

The very small gaps between the die and the movable dies can cause the occurrence of projections in the rack guide base body, which is a casting, in consequence of the fact that molten metal is supplied thereto. If such projections are present on the rack guide base body, there is the problem that unless the rack guide base body is subjected to machining in the same way as the projections after the cutting of the aforementioned runners, the rack guide base body cannot be disposed in the cylindrical housing. This constitutes another factor leading to higher cost due to machining.

DISCLOSURE OF THE INVENTION

Problems to be Solved by the Invention

The present invention has been devised in view of the above-described problems, and its object is to provide a method of manufacturing a rack guide base body which is made of aluminum or zinc, or an aluminum alloy or a zinc alloy, and which makes it unnecessary to provide any machining for its outer peripheral surface in the rack guide consisting of a combination of the rack guide base body and the slider, as well as a rack guide using the rack guide base body obtained by that method.

In accordance with a first aspect of the invention, a method of manufacturing a rack guide base body in a rack guide consisting of a rack guide base body for use in a rack-and-pinion type steering apparatus and a slider secured to the rack guide base body, is characterized by comprising the steps of: forming in a die a cavity having a pair of semicylindrical convex surfaces each having at its one axial end a semicylindrical convex surface edge located on an inner side via a pair of inclined circular arc-shaped stepped portions each inclined with respect to an axial direction and extending in the shape of a circular arc and a perpendicular circular arc-shaped stepped portion perpendicular to the axial direction and extending in the shape of a circular arc in such a manner as to be connected at one end thereof to one end of one of the inclined circular arc-shaped stepped portions and to be connected at another end thereof to one end of the other one of the inclined circular arc-shaped stepped portions, the cavity further having a pair of flat surfaces each located between the pair of semicylindrical convex surfaces, a recessed surface located on one axial end portion side inwardly of the pair of semicylindrical convex surfaces and the flat surfaces, and a cylindrical surface located on another axial end portion side inwardly of the pair of semicylindrical convex surfaces and the flat surfaces; forming runner channels for respectively allowing the cavity to communicate with a gate at one of the flat surfaces and with an overflow well at the other one of the flat surfaces; die casting the rack guide base body by forcing molten metal of aluminum or zinc, or an aluminum alloy or a zinc alloy, from the gate into the cavity; and cutting off runners integrally joined to flat surfaces of the rack guide base body formed by the respective flat surfaces.

In accordance with the method of manufacturing a rack guide base body according to the first aspect, a pair of flat surfaces is formed on the outer peripheral surface of the die-cast rack guide base body, while the outer peripheral surface excluding these flat surfaces is formed into cylindrical surfaces. Therefore, as the runners joined integrally to the respective flat surfaces are cut off at positions which do not project from a phantom circle defined by the semicylindrical surfaces, the cut remnants of the runners do not project from the phantom circle defined by the semicylindrical surfaces. Accordingly, even if the gap which is set between the outer peripheral surface of the rack guide and an inner peripheral surface of a cylindrical housing in which the rack guide base body is disposed is extremely small on the order of 1 to 20 μm, it is unnecessary to effect machining for the entire outer peripheral surface of the rack guide base body. Since the rack guide base body can be disposed as die cast, it is possible to substantially reduce the cost required for machining the entire outer peripheral surface of the rack guide base body. As a result, this permits a reduction in the manufacturing cost of the rack guide. Moreover, the pair of semicylindrical surfaces is formed on the outer peripheral surface of the rack guide base body. Each of the pair of semicylindrical surfaces has, at its boundary with one axial end face and the concavely recessed surface, the pair of inclined circular arc-shaped surface edges and the perpendicular circular arc-shaped surface edge which are located on the inner side via the stepped portions. As a result, even if slight projections are produced at the pairs of the inclined circular arc-shaped surface edges and the perpendicular circular arc-shaped surface edges, the rack guide base body as die cast without being subjected to machining can be disposed in the cylindrical housing. In combination with the above-described effect, it is possible to substantially reduce the cost required for machining, thereby permitting a further reduction in the manufacturing cost of the rack guide.

The method of manufacturing a rack guide base body in accordance with a second aspect of the invention is characterized in that, in the manufacturing method according to the first aspect, the cavity is formed which has a circular arc-shaped recessed surface.

In accordance with the manufacturing method according to the second aspect, it is possible to manufacture the rack guide base body which has a circular arc-shaped recessed surface. As a result, as a circular arc-shaped slider corresponding to such a recessed surface is secured to that circular arc-shaped recessed surface, a rack bar with a circular cross-sectional shape can be slidingly supported by means of the slider.

The method of manufacturing a rack guide base body in accordance with a third aspect of the invention is characterized in that, in the manufacturing method according to the first aspect, the cavity is formed which has a recessed surface including a pair of mutually opposing flat surfaces and a pair of inclined surfaces respectively extending integrally from the pair of flat surfaces.

In accordance with the manufacturing method according to the third aspect, it is possible to manufacture the rack guide base body which has a recessed surface including the pair of mutually opposing flat surfaces and the pair of inclined surfaces respectively extending integrally from the pair of flat surfaces. As a result, as a slider corresponding to such flat surfaces and inclined surfaces is secured to the pair of flat surfaces and the pair of inclined surfaces, the rack bar having the inclined surfaces can be slidingly supported by means of the slider.

The method of manufacturing a rack guide base body in accordance with a fourth aspect of the invention is characterized in that, in the manufacturing method according to any one of the first to third aspects, the cavity is formed which further has a small-diameter cylindrical surface connected at one end to a center of a bottom of the recessed surface, located inwardly of the pair of semicylindrical convex surfaces and the flat surfaces, and having a diameter smaller than that of the cylindrical surface. The method of manufacturing a rack guide base body in accordance with a fifth aspect of the invention is characterized in that, in the manufacturing method according to the fourth aspect, the cavity is formed which further has an annular surface connected at its inner peripheral end to another end of the small-diameter cylindrical surface and connected at its outer peripheral end to one end of the cylindrical surface.

In accordance with the manufacturing methods according to these fourth and fifth aspects, it is possible to manufacture the rack guide base body which has a hole in the center of the bottom of the recessed surface. As a result, by using a slider having a projecting portion which fits in such a hole, the slider can be reliably fixed to the recessed surface. The hole to be formed may be a through hole or a hole with a bottom instead of it.

The method of manufacturing a rack guide base body in accordance with a sixth aspect of the invention is characterized in that, in the manufacturing method according to any one of the first to fifth aspects, the cavity is formed which has a pair of flat surfaces connected to respective ends of a bottom of the recessed surface and opposed to each other.

In accordance with the manufacturing method according to the sixth aspect, a surplus portion of molten metal of aluminum or zinc, or an aluminum alloy or a zinc alloy (hereafter referred to "aluminum or the like"), which has been injected from one flat surface side can be discharged from the other flat surface side opposing the one flat surface, so that the molten metal can be filled uniformly into the cavity. As a result, it is possible to prevent the occurrence of porosity, surface defects, and the like. Moreover, as a result of the fact that it is possible to manufacture the rack guide base body in which the pair of flat surfaces are connected to respective ends of the bottom of the recessed surface and are opposed to each other, as compared with a case where the pair of flat surfaces are connected to apex portions of the recessed surface, it becomes possible to provide a rack guide whose movement is smoothly guided by the cylindrical housing of the rack-and-pinion type steering apparatus.

The method of manufacturing a rack guide base body in accordance with a seventh aspect of the invention is characterized in that the cavity is formed which has the pair of flat surfaces each having at one axial end thereof a flat surface edge located on the inner side via a perpendicular stepped portion extending perpendicular to the axial direction and connected to another end of a corresponding one of the inclined circular arc-shaped stepped portions. In this case, as in the method of manufacturing a rack guide base body in accordance with an eighth aspect of the invention, the cavity may be formed which has the pair of flat surfaces connected to respective ends of the bottom of the recessed surface via the perpendicular stepped portions and the flat surface edges and opposed to each other.

The method of manufacturing a rack guide base body in accordance with a ninth aspect of the invention is characterized in that the cavity is formed which has at least one row of semi-annular recessed portions communicating with each other and provided in respective ones of the pair of semicylindrical convex surfaces and the pair of flat surfaces. The method of manufacturing a rack guide base body in accordance with a 10th aspect of the invention is characterized in that the cavity is formed which has at least two rows of semi-annular recessed portions communicating with each other and provided in respective ones of the pair of semicylindrical convex surfaces and the pair of flat surfaces.

The method of manufacturing a rack guide base body in accordance with an 11th aspect of the invention is characterized in that semi-annular recessed portions are provided in the respective ones of the pair of semicylindrical convex surfaces and the pair of flat surfaces which are located at positions offset in an axial direction from the recessed surface toward a side of the cylindrical surface.

In accordance with the manufacturing method according to the ninth, 10th, or 11th aspect, it is possible to manufacture the rack guide base body having an annular groove in the outer peripheral surface consisting of the pair of semicylindrical surfaces and the pair of flat surfaces. As a result, by fitting an elastic ring in such an annular groove, it is possible to produce a gap which is maintained by the elastic ring between the rack guide base body and the cylindrical housing in which the rack guide base body is fitted. Thus, it is possible to prevent a so-called "metal of similar composition" which is likely to occur between the two members of the rack guide base body and the cylindrical housing as metals of similar metals are brought into sliding contact with each other. Further, it is possible to overcome the problem that the movement of the rack guide toward the rack bar is hampered by an increase in the frictional resistance and the occurrence of adhesive wear accompanying such a "metal of similar composition." Consequently, it becomes possible to allow the movement of the rack guide with respect to the rack bar to be effected smoothly. Preferably, as in the manufacturing method according to the ninth aspect, the rack guide base body having two rows of annular grooves in the outer peripheral surface is manufactured by forming the cavity having at least two rows of semi-annular recessed portions, and by fitting elastic rings respectively in these two rows of annular grooves, it is possible to prevent the swinging movement of the rack guide base body in the cylindrical housing, in addition to the above-described advantages.

The method of manufacturing a rack guide base body in accordance with a 12th aspect of the invention is characterized in that runner channels are formed for allowing the cavity to communicate in the one flat surface with the gate at a plurality of positions separated with respect to the axial direction by the semi-annular recessed portions and communicate in the other flat surface with the overflow well at a plurality of positions separated with respect to the axial direction by the semi-annular recessed portions.

In accordance with the manufacturing method according to the 12th aspect, the molten metal of aluminum or the like can be filled uniformly into the cavity, with the result that it is possible to prevent the occurrence of porosity, surface defects, and the like.

The method of manufacturing a rack guide base body in accordance with a 13th aspect of the invention is characterized in that the cavity is formed which has narrow-width protruding portions respectively extending from vicinities of the bottom of the recessed surface to apex surfaces of the recessed surface along edge portions on both sides of the recessed surface.

In accordance with the manufacturing method according to the 13th aspect, it is possible to manufacture the rack guide base body having narrow-width protruding portions respectively extending from vicinities of the bottom of the recessed surface to apex surfaces of the recessed surface along edge portions on both sides of the recessed surface. As a result, in the case where the slider is provided on the recessed surface, the deformation of the slider can be prevented, and the slider can be held reliably on the recessed surface.

A rack guide in accordance with the first aspect of the invention comprises: a rack guide base body having on its outer peripheral surface a pair of semicylindrical surfaces and a pair of flat surfaces each located between the pair of semi-cylindrical surfaces, having a recessed surface located on one axial end portion side inwardly of the pair of semicylindrical surfaces and the flat surfaces, and having a cylindrical surface located on another axial end portion side inwardly of the pair of semicylindrical surfaces and the flat surfaces; and a slider secured to the rack guide base body. Here, each of the pair of semicylindrical surfaces has at its one axial end a pair of inclined circular arc-shaped surface edges each extending in such a manner as to be inclined with respect to the axial direction and located on an inner side via a stepped portion, and a perpendicular circular arc-shaped surface edge extending in such a manner as to be perpendicular with respect to the axial direction and located on the inner side via a stepped portion, the perpendicular circular arc-shaped surface edge being connected at one end thereof to one end of one of the inclined circular arc-shaped surface edges and being connected at another end thereof to one end of the other one of the inclined circular arc-shaped surface edges.

In accordance with the rack guide according to the first aspect, the rack guide has on its outer peripheral surface a pair of semicylindrical surfaces and a pair of flat surfaces, and each of the pair of semicylindrical surfaces has a pair of inclined circular arc-shaped surface edges and a perpendicular circular arc-shaped surface edge. As a result, it is possible to provide the rack guide whose movement is guided smoothly by the cylindrical housing of the rack-and-pinion type steering apparatus irrespective of such as the presence of cut remnants of the runners and projections at the pair of inclined circular arc-shaped surface edges and the perpendicular circular arc-shaped surface edge at the pair of flat surfaces.

In accordance with the rack guide according to a second aspect of the invention, in the rack guide according to the first aspect, the rack guide base body has a circular-arc shaped recessed surface. In accordance with the rack guide according to a third aspect of the invention, in the rack guide according to the first aspect, the rack guide base body has a recessed surface including a pair of mutually opposing flat surfaces and a pair of inclined surfaces respectively extending integrally from the pair of flat surfaces. In accordance with the rack guide according to a fourth aspect of the invention, in the rack guide according to any one of the first to third aspects, the rack guide base body has a hole in a center of a bottom of the recessed surface, and the slider has a projecting portion which is fitted in the hole of the rack guide base body. In accordance with the rack guide according to a fifth aspect of the invention, in the rack guide according to the fourth aspect, the hole is constituted by a through hole or a hole with a bottom. In accordance with the rack guide according to a sixth aspect of the invention, in the rack guide according to any one of the first to fifth aspects, the pair of flat surfaces are connected to respective ends of the bottom of the recessed surface and are located in such a manner as to oppose each other.

In the rack guide in accordance with the invention, as in the rack guide according to a seventh aspect of the invention, each of the pair of flat surfaces may have at its one axial end a flat surface edge extending perpendicular to the axial direction and located on the inner side via a stepped portion, the flat surface edge being connected at one end thereof to another end of one of the inclined circular arc-shaped surface edges and connected at another end thereof to another end of the other one of the inclined circular arc-shaped surface edges. In this case, as in the rack guide according to an eighth aspect of the invention, the pair of flat surfaces may be connected to respective ends of the bottom of the recessed surface via the stepped portions and the flat surface edges and may be located in such a manner as to oppose each other.

Preferably, as in the rack guide in accordance with a ninth aspect of the invention, the rack guide base body has at least one annular groove in the outer peripheral surface consisting of the pair of semicylindrical surfaces and the pair of flat surfaces. More preferably, as in the rack guide in accordance with a 10th aspect of the invention, the rack guide base body has at least two rows of annular grooves in the outer peripheral surface consisting of the pair of semicylindrical surfaces and the pair of flat surfaces. The rack guide in accordance with the ninth or 10th aspect of the invention, as in the rack guide in accordance with an 11th aspect of the invention, preferably further comprises: an elastic ring fitted in the annular groove in such a manner as to partially project from the outer peripheral surface to an outside.

As an elastic ring is fitted in the annular groove provided in the rack guide base body, it is possible to produce the gap which is maintained by the elastic ring between the rack guide base body and the cylindrical housing. Consequently, as described above, it is possible to overcome the problem that the movement of the rack guide toward the rack bar is hampered by an increase in the frictional resistance and the occurrence of adhesive wear accompanying such a "metal of similar composition."Hence, it becomes possible to allow the movement of the rack guide with respect to the rack bar to be effected smoothly. Moreover, even if wheel vibrations are transmitted to the rack guide, the rack guide is prevented from rattling with respect to the cylindrical housing. It is therefore possible to prevent the hammering sound of the rack guide base body with respect to the inner peripheral surface of the cylindrical housing. Furthermore, even if a force acting in a direction perpendicular to the moving direction of rack teeth has been applied to the rack teeth during the steering of the steering wheel, it is possible to prevent the vertical movement, i.e., jerky movement, of the rack guide.

In accordance with the rack guide according to a 12th aspect of the invention, the rack guide base body has narrow-width protruding portions respectively extending from vicinities of the bottom of the recessed surface to apex surfaces of the recessed surface along edge portions on both sides of the recessed surface.

In accordance with the rack guide according to the 12th aspect, in the case where the slider is provided on the recessed surface, the deformation of the slider can be prevented by the narrow-width protruding portions, and the slider can be favorably held reliably on the recessed surface.

In accordance with the invention, a pair of flat surfaces is formed on the outer peripheral surface of the die-cast rack guide base body, while the outer peripheral surface excluding these flat surfaces is formed into cylindrical surfaces. Therefore, as the runners joined integrally to the respective flat surfaces are cut off at positions which do not project from the phantom circle defined by the semicylindrical surfaces, the cut remnants of the runners do not project from the phantom circle defined by the semicylindrical surfaces. Accordingly, even if the gap which is set between the outer peripheral surface of the rack guide and the inner peripheral surface of the cylindrical housing in which the rack guide base body is disposed is extremely small on the order of 1 to 20 μm, it is unnecessary to effect machining for the entire outer peripheral surface of the rack guide base body. Since the rack guide base body can be disposed as die cast, it is possible to substantially reduce the cost required for machining the entire outer peripheral surface of the rack guide base body. As a result, this permits a reduction in the manufacturing cost of the rack guide. Moreover, the pair of semicylindrical surfaces is formed on the outer peripheral surface of the rack guide base body. Each of the pair of semicylindrical surfaces has, at its boundary with one axial end face and the concavely recessed surface, the pair of inclined circular arc-shaped surface edges and the perpendicular circular arc-shaped surface edge which are located on the inner side via the stepped portions. As a result, even if slight projections are produced at the pairs of the inclined circular arc-shaped surface edges and the perpendicular circular arc-shaped surface edges, the rack guide base body as die cast without being subjected to machining can be disposed in the cylindrical housing. In combination with the above-described effect, it is possible to substantially reduce the cost required for machining, thereby permitting a further reduction in the manufacturing cost of the rack guide.

Hereafter, a more detailed description will be given of the mode for carrying out the invention with reference to the preferred embodiments illustrated in the drawings. It should be noted that the invention is not limited by these embodiments.

BEST MODE FOR CARRYING OUT THE INVENTION

Figure 1:
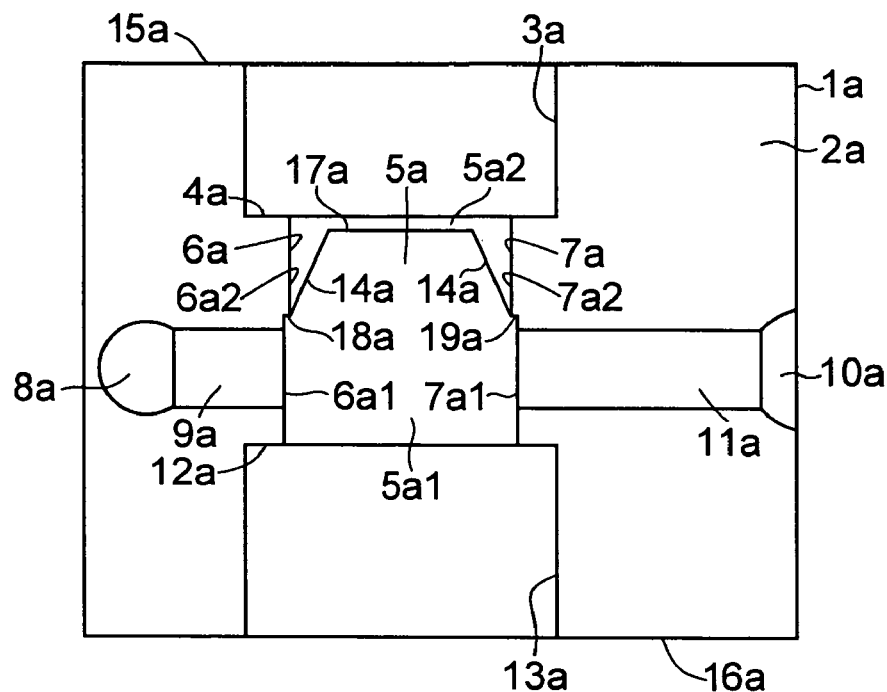
FIG. 1 is a plan view of a lower die half in the manufacturing method of the invention.
Figure 4:
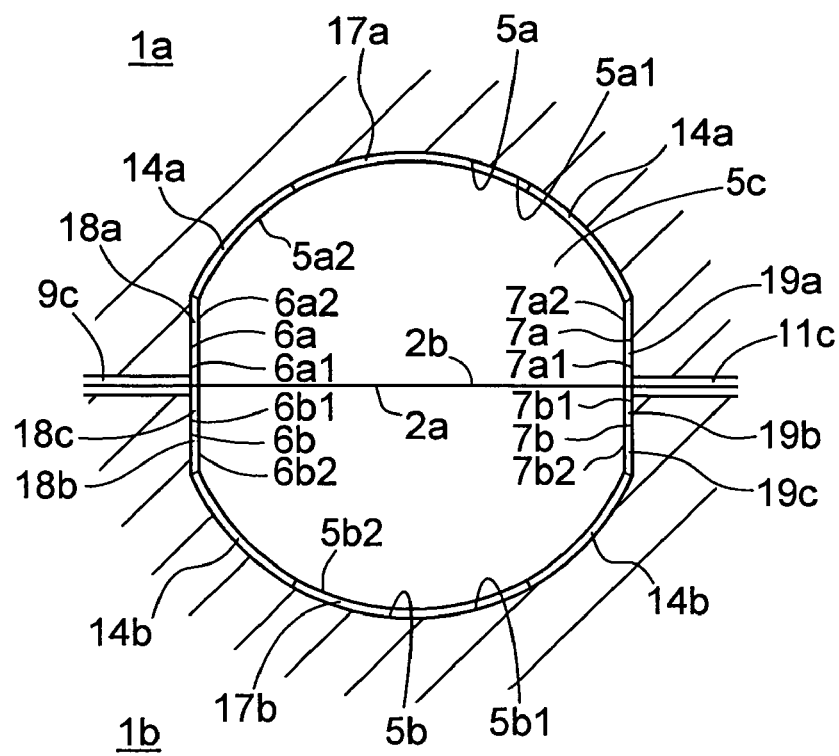
FIG. 4 is a cross-sectional view taken in the direction of arrows along line IV-IV shown in FIG. 3.

In FIGS. 1 to 6, a die 1 is formed by a lower die half 1a and an upper die half 1b which are split in two. As shown in FIGS. 1 and 4, the lower die half 1a is comprised of a semicylindrical concave surface 3a for forming a semicylindrical concave portion which is formed in one surface 2a and is open in one end face 15a of the upper die half 1a; a semicylindrical concave surface 5a whose diameter is reduced relative to the semicylindrical concave surface 3a via an annular stepped portion 4a and which forms a semicylindrical concave portion of an intermediate portion; flat surfaces 6a and 7a formed in face-to-face relation to each other at both edges of the semicylindrical concave surface 5a; a recessed channel 9a with a rectangular cross section having one end communicating with the flat surface 6a and the other end communicating with a recess 8a constituting an overflow well; a recessed channel 11a with a rectangular cross section having one end communicating with the flat surface 7a and the other end communicating with a recess 10a constituting a gate; and a semicylindrical concave surface 13a for forming a semicylindrical concave portion whose diameter is enlarged relative to the semicylindrical concave surface 5a via an annular stepped portion 12a, and which is open in the other end face 16a of the lower die half 1a.

The semicylindrical concave surface 5a has a main semicylindrical concave surface 5a1 whose one axial end terminates at a pair of inclined circular arc-shaped stepped portions 14a and a perpendicular circular arc-shaped stepped portion 17a and whose axial other end terminates at the annular stepped portion 12a, as well as an auxiliary semicylindrical concave surface 5a2 whose one axial end terminates at the annular stepped portion 4a and whose axial other end terminates at the pair of inclined circular arc-shaped stepped portions 14a and the perpendicular circular arc-shaped stepped portion 17a. Each of the inclined circular arc-shaped stepped portions 14a extends in the shape of a circular arc in such a manner as to be inclined with respect to an axial direction. The perpendicular circular arc-shaped stepped portion 17a extends in the shape of a circular arc perpendicularly to the axial direction in such a manner as to be connected at its one end to one end of one inclined circular arc-shaped stepped portion 14a and to be connected at its other end to one end of the other inclined circular arc-shaped stepped portion 14a. The semicylindrical concave surface 5a1 is disposed outwardly of the semicylindrical concave surface 5a2 via the pair of inclined circular arc-shaped stepped portions 14a and the perpendicular circular arc-shaped stepped portion 17a, i.e., its diameter is enlarged. The semicylindrical concave surface 5a2 is disposed inwardly of the semicylindrical concave surface 5a1 via the pair of inclined circular arc-shaped stepped portions 14a and the perpendicular circular arc-shaped stepped portion 17a, i.e., its diameter is reduced.

The flat surface 6a has a main flat surface 6a1 whose one axial end terminates at a perpendicular stepped portion 18a and whose axial other end terminates at the annular stepped portion 12a, as well as an auxiliary flat surface 6a2 whose one axial end terminates at the annular stepped portion 4a and whose axial other end terminates at the perpendicular stepped portion 18a. The perpendicular stepped portion 18a extends perpendicularly to the axial direction in such a manner as to be connected at its one end to the other end of one inclined circular arc-shaped stepped portion 14a and to terminate at its other end at the surface 2a. The flat surface 6a1 is disposed outwardly of the flat surface 6a2 via the perpendicular stepped portion 18a, while the flat surface 6a2 is disposed inwardly of the flat surface 6a1 via the perpendicular stepped portion 18a.

In substantially the same way as the flat surface 6a, the flat surface 7a has a main flat surface 7a1 whose one axial end terminates at a perpendicular stepped portion 19a and whose axial other end terminates at the annular stepped portion 12a, as well as an auxiliary flat surface 7a2 whose one axial end terminates at the annular stepped portion 4a and whose axial other end terminates at the perpendicular stepped portion 19a. The perpendicular stepped portion 19a extends perpendicularly to the axial direction in such a manner as to be connected at its one end to the other end of the other inclined circular arc-shaped stepped portion 14a and to terminate at its other end at the surface 2a. The flat surface 7a1 is disposed outwardly of the flat surface 7a2 via the perpendicular stepped portion 19a, while the flat surface 7a2 is disposed inwardly of the flat surface 7a1 via the perpendicular stepped portion 19a.

Figure 2:
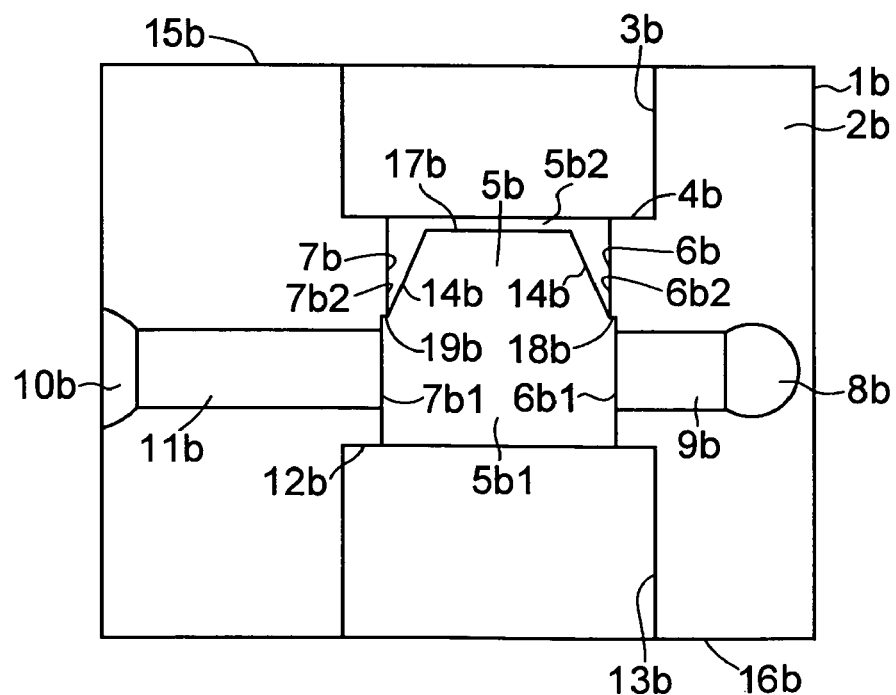
FIG. 2 is a plan view of an upper die half in the manufacturing method of the invention.
Figure 3:
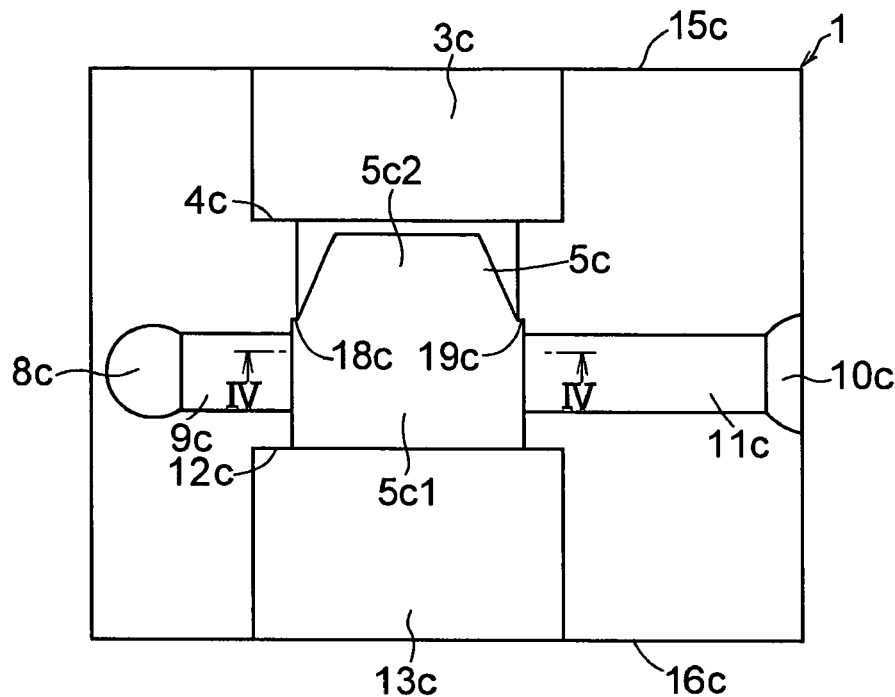
FIG. 3 is a cross-sectional view of a die in the manufacturing method of the invention.

As shown in FIGS. 2 and 4, the upper die half 1b is comprised of a semicylindrical concave surface 3b for forming a semicylindrical concave portion which is formed in one surface 2b and is open in one end face 15b of the upper die half 1b; a semicylindrical concave surface 5b whose diameter is reduced relative to the semicylindrical concave surface 3b via an annular stepped portion 4b and which forms a semicylindrical concave portion of an intermediate portion; flat surfaces 6b and 7b formed in face-to-face relation to each other at both edges of the semicylindrical concave surface 5b; a recessed channel 9b with a rectangular cross section having one end communicating with the flat surface 6b and the other end communicating with a recess 8b constituting the overflow well; a recessed channel 11b with a rectangular cross section having one end communicating with the flat surface 7b and the other end communicating with a recess 10b constituting the gate; and a semicylindrical concave surface 13b for forming a semicylindrical concave portion whose diameter is enlarged relative to the semicylindrical concave surface 5b via an annular stepped portion 12b, and which is open in the other end face 16b of the upper die half 1b.

The semicylindrical concave surface 5b has a main semicylindrical concave surface 5b1 whose one axial end terminates at a pair of inclined circular arc-shaped stepped portions 14b and a perpendicular circular arc-shaped stepped portion 17b and whose axial other end terminates at the annular stepped portion 12b, as well as an auxiliary semicylindrical concave surface 5b2 whose one axial end terminates at the annular stepped portion 4b and whose axial other end terminates at the pair of inclined circular arc-shaped stepped portions 14b and the perpendicular circular arc-shaped stepped portion 17b. Each of the inclined circular arc-shaped stepped portions 14b extends in the shape of a circular arc in such a manner as to be inclined with respect to an axial direction. The perpendicular circular arc-shaped stepped portion 17b extends in the shape of a circular arc perpendicularly to the axial direction in such a manner as to be connected at its one end to one end of one inclined circular arc-shaped stepped portion 14b and to be connected at its other end to one end of the other inclined circular arc-shaped stepped portion 14b. The semicylindrical concave surface 5b1 is disposed outwardly of the semicylindrical concave surface 5b2 via the pair of inclined circular arc-shaped stepped portions 14b and the perpendicular circular arc-shaped stepped portion 17b, i.e., its diameter is enlarged. The semicylindrical concave surface 5b2 is disposed inwardly of the semicylindrical concave surface 5b1 via the pair of inclined circular arc-shaped stepped portions 14b and the perpendicular circular arc-shaped stepped portion 17b, i.e., its diameter is reduced.

The flat surface 6b has a main flat surface 6b1 whose one axial end terminates at a perpendicular stepped portion 18b and whose axial other end terminates at the annular stepped portion 12b, as well as an auxiliary flat surface 6b2 whose one axial end terminates at the annular stepped portion 4b and whose axial other end terminates at the perpendicular stepped portion 18b. The perpendicular stepped portion 18b extends perpendicularly to the axial direction in such a manner as to be connected at its one end to the other end of one inclined circular arc-shaped stepped portion 14b and to terminate at its other end at the surface 2b. The flat surface 6b1 is disposed outwardly of the flat surface 6b2 via the perpendicular stepped portion 18b, while the flat surface 6b2 is disposed inwardly of the flat surface 6b1 via the perpendicular stepped portion 18b.

In substantially the same way as the flat surface 6b, the flat surface 7b has a main flat surface 7b1 whose one axial end terminates at a perpendicular stepped portion 19b and whose axial other end terminates at the annular stepped portion 12b, as well as an auxiliary flat surface 7b2 whose one axial end terminates at the annular stepped portion 4b and whose axial other end terminates at the perpendicular stepped portion 19b. The perpendicular stepped portion 19b extends perpendicularly to the axial direction in such a manner as to be connected at its one end to the other end of the other inclined circular arc-shaped stepped portion 14b and to terminate at its other end at the surface 2b. The flat surface 7b1 is disposed outwardly of the flat surface 7b2 via the perpendicular stepped portion 19b, while the flat surface 7b2 is disposed inwardly of the flat surface 7b1 via the perpendicular stepped portion 19b.

As one surface 2b of the upper die half 1b is superposed on one surface 2a of the lower die half 1a, the following are respectively connected in flush with each other by the surfaces 2a and 2b: the respective semicylindrical concave surfaces 3a and 3b; the respective surfaces of the annular stepped portions 4a and 4b; the respective flat surfaces 6a1 and 6b1; the respective flat surfaces 6a2 and 6b2; the respective flat surfaces 7a1 and 7b1; the respective flat surfaces 7a2 and 7b2; the respective surfaces of the perpendicular stepped portions 18a and 18b; the respective surfaces of the perpendicular stepped portions 19a and 19b; the respective surfaces of the annular stepped portions 12a and 12b; and the respective semicylindrical concave surfaces 13a and 13b. Thus, as particularly shown in FIGS. 3 and 4, the following are formed in the die 1: a cylindrical hollow portion 3c which is open in one end face 15c formed by the end faces 15a and 15b, and is surrounded by the semicylindrical concave surfaces 3a and 3b; a substantially cylindrical hollow portion 5c whose diameter is reduced via an annular stepped portion 4c formed by the annular stepped portions 4a and 4b, and which communicates with the cylindrical hollow portion 3c and is surrounded by the semicylindrical concave surfaces 5a and 5b and the flat surfaces 6a, 7a and 6b, 7b; a cylindrical hollow portion 13c whose diameter is enlarged via an annular stepped portion 12c formed by the annular stepped portions 12a and 12b, and which communicates with the substantially cylindrical hollow portion 5c, is open in the other end face 16c formed by the end faces 16a an 16b, and is surrounded by the semicylindrical concave surfaces 13a and 13b; a hollow portion 9c with a rectangular cross section which has one end communicating with the substantially cylindrical hollow portion 5c at the flat surfaces 6a1 and 6b1 of the one flat surfaces 6a and 6b and the other end communicating with a hollow portion 8c constituting the overflow well and formed by the recesses 8a and 8b, the hollow portion 9c being formed by the recessed channels 9a and 9b; a hollow portion 11c with a rectangular cross section which has one end communicating with the substantially cylindrical hollow portion 5c at the flat surfaces 7a1 and 7b1 of the other flat surfaces 7a and 7b and the other end communicating with a hollow portion 10c constituting the gate and formed by the recesses 10a and 10b, the hollow portion 11c being formed by the recessed channels 11a and 11b; a perpendicular stepped portion 18c formed by the perpendicular stepped portions 18a and 18b and extending straightly; and a perpendicular stepped portion 19c formed by the perpendicular stepped portions 19a and 19b and extending straightly.

The substantially cylindrical hollow portion 5c consists of a main hollow portion 5c1 communicating with the cylindrical hollow portion 13c and surrounded by the semicylindrical concave surfaces 5a1 and 5b1 and the flat surfaces 6a1, 7a1, 6b1, and 7b1, as well as an auxiliary hollow portion 5c2 communicating with the cylindrical hollow portion 3c and surrounded by the semicylindrical concave surfaces 5a2 and 5b2 and the flat surfaces 6a2, 7a2, 6b2, and 7b2.

Figure 5:
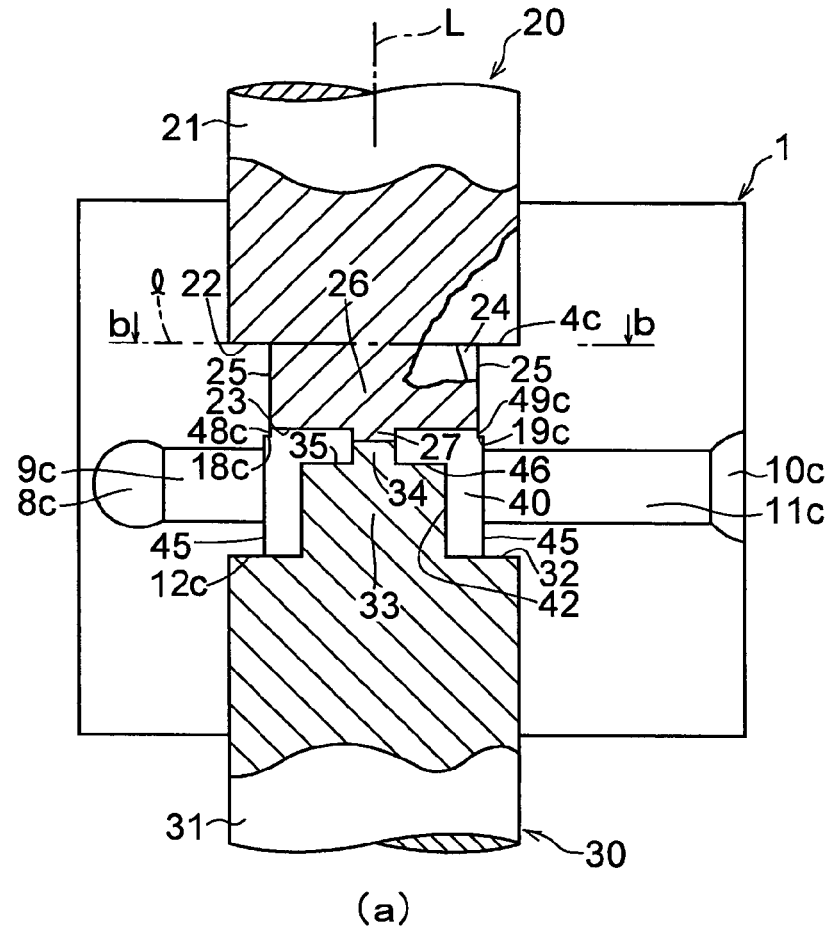
FIG. 5 is a cross-sectional view illustrating a hollow portion formed in the die, in which the part (a) is a horizontal cross-sectional view, and the part (b) is a vertical cross-sectional view taken in the direction of arrows b-b shown in the part (a)
Figure 5:
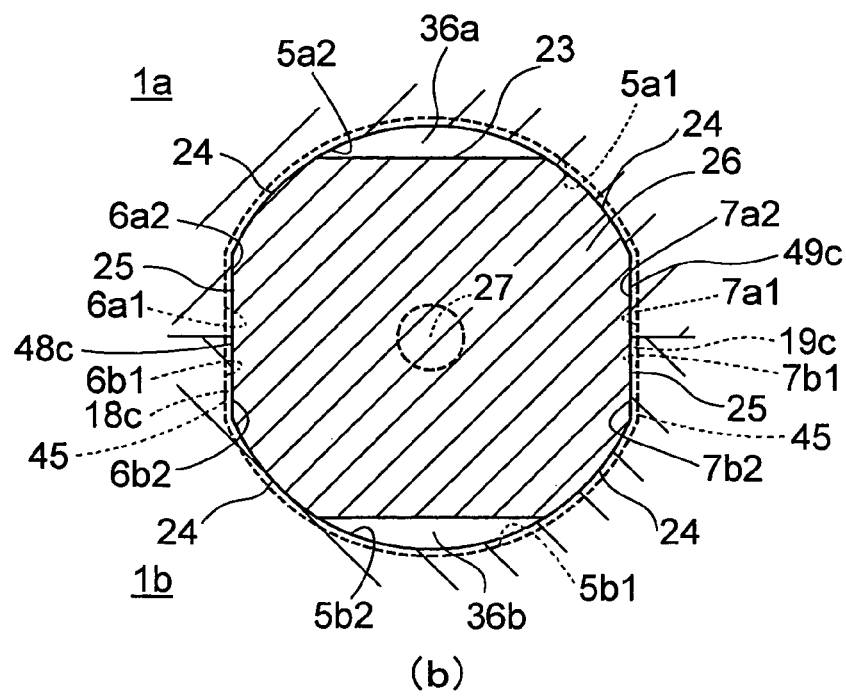
Figure 6:
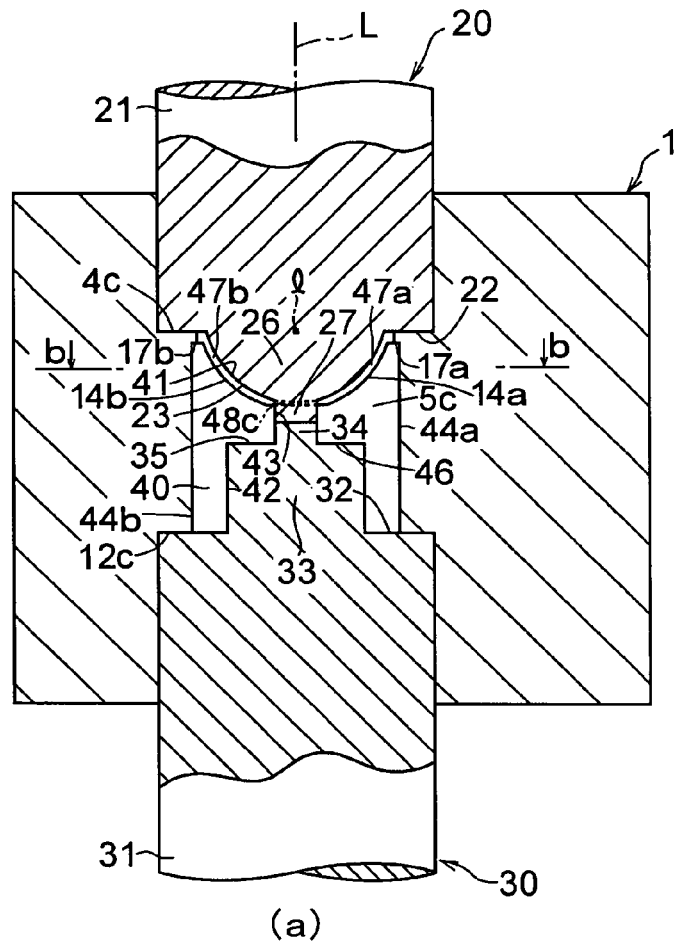
FIG. 6 is a cross-sectional view illustrating the hollow portion formed in the die, in which the part (a) is a horizontal cross-sectional view, and the part (b) is a vertical cross-sectional view taken in the direction of arrows b-b shown in the part (a)
Figure 6:
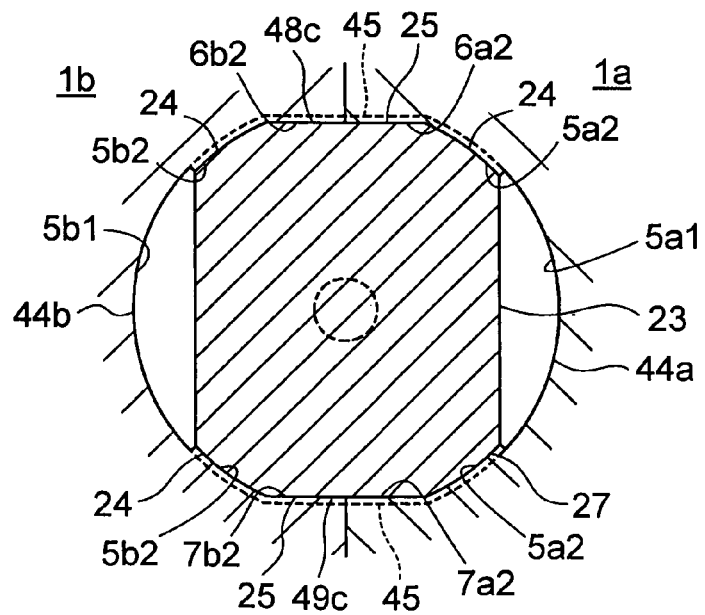

As particularly shown in FIGS. 5 and 6, a movable die 20 is inserted in the cylindrical hollow portion 3c of the die 1. The movable die 20 has a circular cylindrical portion 21 of a shape complementary to the cylindrical hollow portion 3c, a circular arc-shaped projecting portion 26, and a circular cylindrical projecting portion 27 formed integrally on a central portion of the circular arc-shaped projecting portion 26. The circular arc-shaped projecting portion 26 is formed integrally on one end face of the circular cylindrical portion 21 by leaving a flat portion 22 around its peripheral edge. The outer surface of the circular arc-shaped projecting portion 26 is formed into a convexly projecting surface 23 which is circular arc-shaped about an axis 1 located perpendicular to an axis L of the circular cylindrical portion 21 and at the same position as the flat portion 22 or on the cylindrical hollow portion 3c side in the axial direction. The convexly projecting surface 23 has a radius of curvature which is smaller than the radius of curvature of the semicylindrical concave surface 5a2 or 5b2 and is shorter than the distance between the annular stepped portion 4c and the perpendicular stepped portion 18c (or the perpendicular stepped portion 19c) by a length corresponding to the distance between the annular stepped portion 4a and the perpendicular circular arc-shaped stepped portion 17a (or the distance between the annular stepped portion 4b and the perpendicular circular arc-shaped stepped portion 17b), such that a pair of crescent-shaped opening surfaces 36a and 36b are produced at the opening surface of the hollow portion 5c2, which communicates with the cylindrical hollow portion 3c, with respect to the semicylindrical concave surfaces 5a2 and 5b2, respectively. Both end faces of the circular arc-shaped projecting portion 26 respectively have cylindrical surfaces 24 and flat surfaces 25 which are of a shape complementary to the semicylindrical concave surfaces 5a2 and 5b2 and the flat surfaces 6a2, 6b2 and 7a2, 7b2 defining the hollow portion 5c2 of the die 1. The movable die 20 is inserted such that the flat portion 22 abuts against the annular stepped portion 4c of the die 1, and the circular arc-shaped projecting portion 26 is located in the substantially cylindrical hollow portion 5c.

As particularly shown in FIGS. 5 and 6, a movable die 30 is inserted in the cylindrical hollow portion 13c. The movable die 30 has a circular cylindrical portion 31 of a shape complementary to the cylindrical hollow portion 13c, a circular cylindrical projecting portion 33 formed integrally on one end face of the circular cylindrical portion 31 by leaving an annular flat portion 32 around its peripheral edge, and a circular cylindrical projecting portion 34 formed integrally on a central portion of an end face of the circular cylindrical projecting portion 33 by leaving an annular flat portion 35. The movable die 30 is inserted such that the flat portion 32 abuts against the annular stepped portion 12c of the die 1, the circular cylindrical projecting portion 34 abuts against an end face of the circular cylindrical projecting portion 27, and the circular cylindrical projecting portion 33 is located in the substantially cylindrical hollow portion 5c.

A cavity 40 is formed in the die 1 by means of the die 1 consisting of the lower die half 1a and the upper die half 1b as well as the movable die 20 and the movable die 30. The cavity 40 is provided with the following: a semicylindrical convex surface 44a (corresponding to the semicylindrical concave surface 5a) having at its one axial end a semicylindrical convex surface edge 47a (corresponding to the semicylindrical concave surface 5a2) located on the inner side via a pair of inclined circular arc-shaped stepped portions (corresponding to the pair of inclined circular arc-shaped stepped portions 14a) each extending in the shape of a circular arc in such a manner as to be inclined with respect to the axial direction and a perpendicular circular arc-shaped stepped portion (corresponding to the perpendicular circular arc-shaped stepped portion 17a) extending in the shape of a circular arc perpendicularly to the axial direction in such a manner as to be connected at its one end to one end of one inclined circular arc-shaped stepped portion and to be connected at its other end to one end of the other inclined circular arc-shaped stepped portion; as well as a semicylindrical convex surface 44b (corresponding to the semicylindrical concave surface 5b) having at its one axial end a semicylindrical convex surface edge 47b (corresponding to the semicylindrical concave surface 5b2) located on the inner side via a pair of inclined circular arc-shaped stepped portions (corresponding to the pair of inclined circular arc-shaped stepped portions 14b) each extending in the shape of a circular arc in such a manner as to be inclined with respect to the axial direction and a perpendicular circular arc-shaped stepped portion (corresponding to the perpendicular circular arc-shaped stepped portion 17b) extending in the shape of a circular arc perpendicularly to the axial direction in such a manner as to be connected at its one end to one end of one inclined circular arc-shaped stepped portion and to be connected at its other end to one end of the other inclined circular arc-shaped stepped portion. The cavity 40 is further provided with a pair of flat surfaces 45 (corresponding to portions of the flat surfaces 6a1, 7a1 and 6b1, 7b1 and the flat surfaces 6a2, 7a2 and 6b2, 7b2) located between the pair of semicylindrical convex surfaces 44a and 44b in such a manner as to oppose each other and having at their one axial ends flat surface edges 48c and 49c (corresponding to portions of the flat surfaces 6a2, 7a2 and 6b2, 7b2) located on the inner side via perpendicular stepped portions (corresponding to the perpendicular stepped portions 18c and 19c) extending perpendicular to the axial direction and connected to the other ends of corresponding inclined circular arc-shaped stepped portions (each corresponding to either one of the pairs of the inclined circular arc-shaped stepped portions 14a and 14b). The cavity 40 is further provided with a circular arc-shaped concavely recessed surface 41 (corresponding to the convexly projecting surface 23) located on one axial end portion side inwardly of the pair of semicylindrical convex surfaces 44a and 44b and the flat surfaces 45; and a cylindrical surface 42 (corresponding to an outer peripheral cylindrical surface of the circular cylindrical projecting portion 33) located on the other axial end portion side inwardly of the pair of semicylindrical convex surfaces 44a and 44b and the flat surfaces 45. The cavity 40 further has a cylindrical surface 43 (corresponding to outer peripheral cylindrical surfaces of the circular cylindrical projecting portions 27 and 34) which is connected at its one end to a center of the bottom of the concavely recessed surface 41 on the other axial end portion side, is located inwardly of the pair of semicylindrical convex surfaces 44a and 44b and the flat surfaces 45, and has a smaller diameter than the cylindrical surface 42; and an annular surface 46 (corresponding to the flat portion 35) which is connected at its inner peripheral end to the other end of the small-diameter cylindrical surface 43 and is connected at its outer peripheral end to one end of the cylindrical surface 42, the pair of mutually opposing flat surfaces 45 being connected to respective ends of the bottom of the concavely recessed surface 41 via the flat surface edges 48c and 49c and the perpendicular stepped portions (corresponding to the perpendicular stepped portions 18c and 19c). Further formed in the die 1 are the hollow portion 11c with a rectangular cross section which has one end communicating with the cavity 40 and the other end communicating with the hollow portion 10c constituting the gate, the hollow portion 11c forming a runner channel for allowing the hollow portion 10c to communicate with the cavity 40 at one flat surface 45; and the hollow portion 9c with a rectangular cross section which has one end communicating with the cavity 40 and the other end communicating with the hollow portion 8c constituting the overflow well, the hollow portion 9c forming a runner channel for allowing the hollow portion 8c to communicate with the cavity 40 at the other flat surface 45.

In addition, molten metal of such as aluminum is forced into the cavity 40 through the hollow portion 10c serving as the gate, so as to effect die casting.

Figure 7:
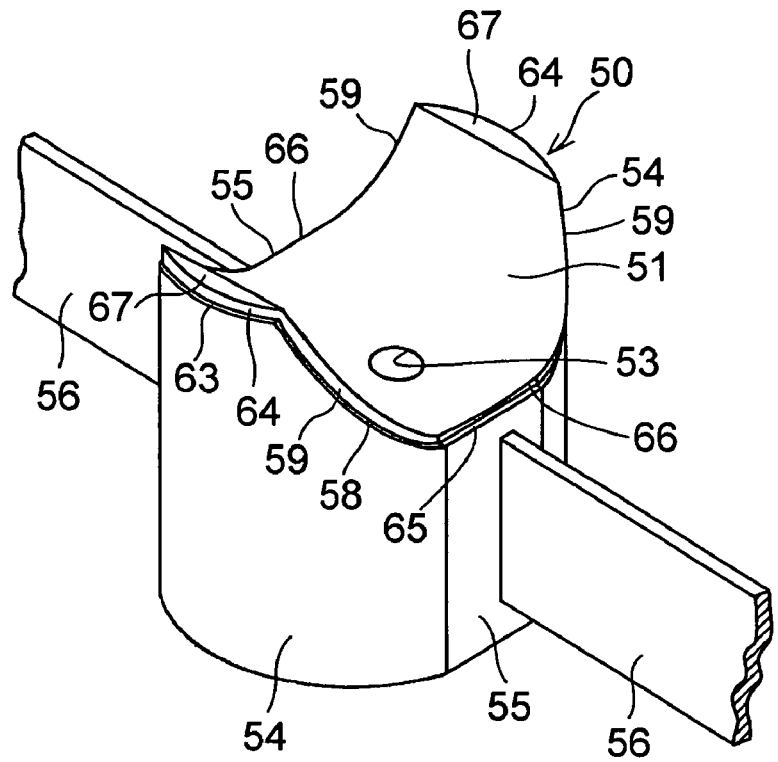
FIG. 7 is a perspective view illustrating a rack guide base body after die casting.

FIG. 7 shows a rack guide base body 50 removed from the die 1 after die casting. The rack guide base body 50 has a pair of crescent-shaped end faces 67 at its one axial end, and has on its outer peripheral surface a pair of semicylindrical surfaces 54 and a pair of flat surfaces 55 each located between the pair of semicylindrical surfaces 54. The rack guide base body 50 further has a circular arc-shaped concavely recessed surface 51 located on one axial end portion side inwardly of the pair of semicylindrical surfaces 54 and the flat surfaces 55; a cylindrical surface 52 (see FIG. 8) located on the other axial end portion side inwardly of the pair of semicylindrical surfaces 54 and the flat surfaces 55; and a circular hole 53 located in the center of the bottom of the concavely recessed surface 51. Each of the pair of semicylindrical surfaces 54 has at its one axial end a pair of inclined circular arc-shaped surface edges 59 extending in such a manner as to be inclined with respect to the axial direction and located on the inner side via a pair of stepped portions 58 (corresponding to the inclined circular arc-shaped stepped portions 14a or 14b), as well as a perpendicular circular arc-shaped surface edge 64 extending perpendicular to the axial direction and located on the inner side via a stepped portion 63 (corresponding to the perpendicular circular arc-shaped stepped portion 17a or 17b), the perpendicular circular arc-shaped surface edge 64 being connected at its one end to one end of one inclined circular arc-shaped surface edge 59 and connected at its other end to one end of the other inclined circular arc-shaped surface edge 59 (the inclined circular arc-shaped surface edge 59 and the perpendicular circular arc-shaped surface edge 64 respectively correspond to the semicylindrical convex surface edges 47a and 47b). Each of the flat surfaces 55 has a flat surface edge 66 (corresponding to the flat surface edge 48c or 49c) extending perpendicular to the axial direction and located on the inner side via a stepped portion 65 (corresponding to the perpendicular stepped portion 18c or 19c), the flat surface edge 66 being connected at its one end to the other end of one inclined circular arc-shaped surface edge 59 and connected at its other end to the other end of the other inclined circular arc-shaped surface edge 59. A pair of runners 56 is integrally joined to the respective flat surfaces 55 which are connected to the respective ends of the bottom of the concavely recessed surface 51 via the flat surface edges 66 and the stepped portions 65, and are located in such a manner as to oppose each other.

The rack guide base body 50 for use in a rack-and-pinion type steering apparatus is formed as the pair of runners 56 joined integrally to the flat surfaces 55 formed by the flat surfaces 6a, 7a and 6b, 7b and excluding the flat surface edges 66 are cut off along the flat surfaces 55 at positions which do not project from a phantom circle 57 (see FIG. 9) defined by the semicylindrical surfaces 54 at the outer peripheral surface.

The cut remnants of the runners 56 at the flat surfaces 55 of the rack guide base body 50 do not project from the phantom circle 57 defined by the semicylindrical surfaces 54 at the outer peripheral surface. Therefore, even with a very small gap of 1 to 20 µm which is set between the semicylindrical surface 54 at the outer peripheral surface and an inner peripheral surface of a cylindrical housing of the rack-and-pinion type steering apparatus where the rack guide base body 50 is disposed, it is unnecessary to separately remove the cut remnants of the runners 56 and effect machining for the entire outer peripheral surface of the rack guide base body 50. Since the rack guide base body 50 can be disposed as die cast, it is possible to substantially reduce the cost required for machining the entire outer peripheral surface of the rack guide base body 50. As a result, this permits a reduction in the manufacturing cost of the rack guide. Moreover, the pair of semicylindrical surfaces 54 is formed on the outer peripheral surface of the rack guide base body 50. Each of the pair of semicylindrical surfaces 54 has, at its boundary with the end face 67 and the concavely recessed surface 51, the pair of inclined circular arc-shaped surface edges 59 and the perpendicular circular arc-shaped surface edge 64 which are located on the inner side via the stepped portions 58 and 63. As a result, even if slight projections attributable to the gap between the die 1 and the movable die 20 are produced at outer edges of the inclined circular arc-shaped surface edges 59 and the perpendicular circular arc-shaped surface edges 64, such projections can also be made not to project from the phantom circle 57. Therefore, the rack guide base body 50 as die cast without being subjected to machining can be disposed in the cylindrical housing. In combination with the above-described effect, it is possible to substantially reduce the cost required for machining, thereby permitting a further reduction in the manufacturing cost of the rack guide.

Figure 8:
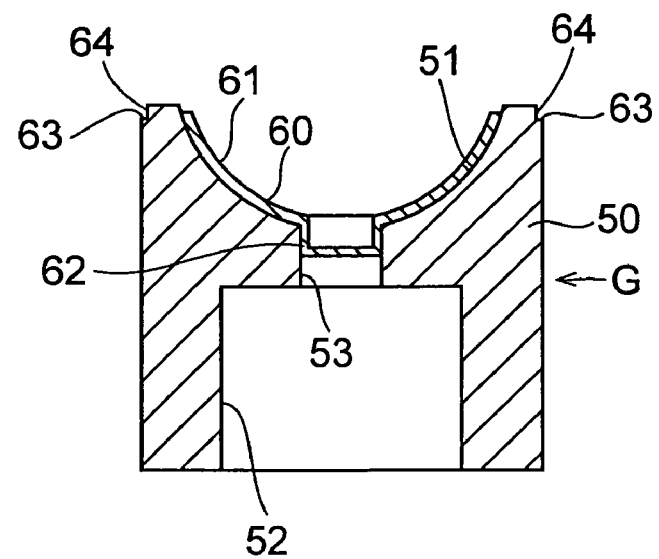
FIG. 8 is a cross-sectional view of a rack guide, as viewed in the direction of arrows along line VIII-VIII shown in FIG. 9.
Figure 9:
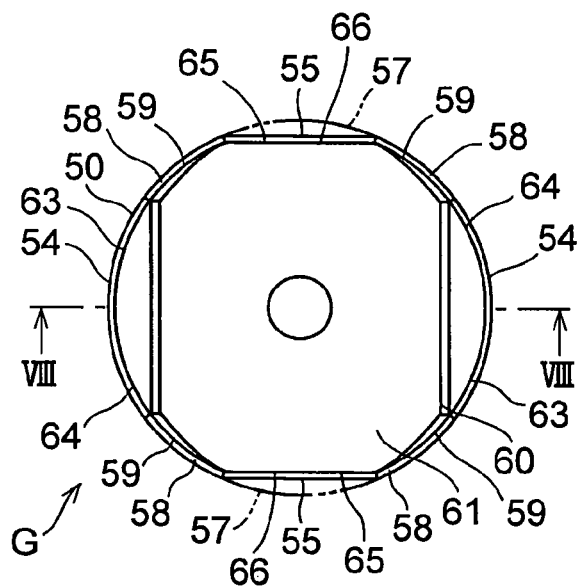
FIG. 9 is a plan view of the rack guide shown in FIG. 8.

As shown in FIGS. 8 and 9, a slider 60, which has a circular arc-shaped concavely recessed surface 61 of a shape complementary to the concavely recessed surface 51 and an engaging projection 62 serving as a projecting portion on a reverse surface of the concavely recessed surface 61, is seated on the concavely recessed surface 51 such that the engaging projection 62 is fitted in the hole 53 formed in the center of the concavely recessed surface 51 of the rack guide base body 50. Thus a rack guide G in which the slider 60 is secured to the rack guide base body 50 is formed.

As the slider 60, it is suitable to use a synthetic resin such as a polyacetal resin or a polyamide resin, or a multilayered material consisting of a steel sheet, a porous metal sintered layer deposited and formed integrally on this steel sheet, and a synthetic resin layer impregnating and coated on this porous metal sintered layer.

Figure 10:
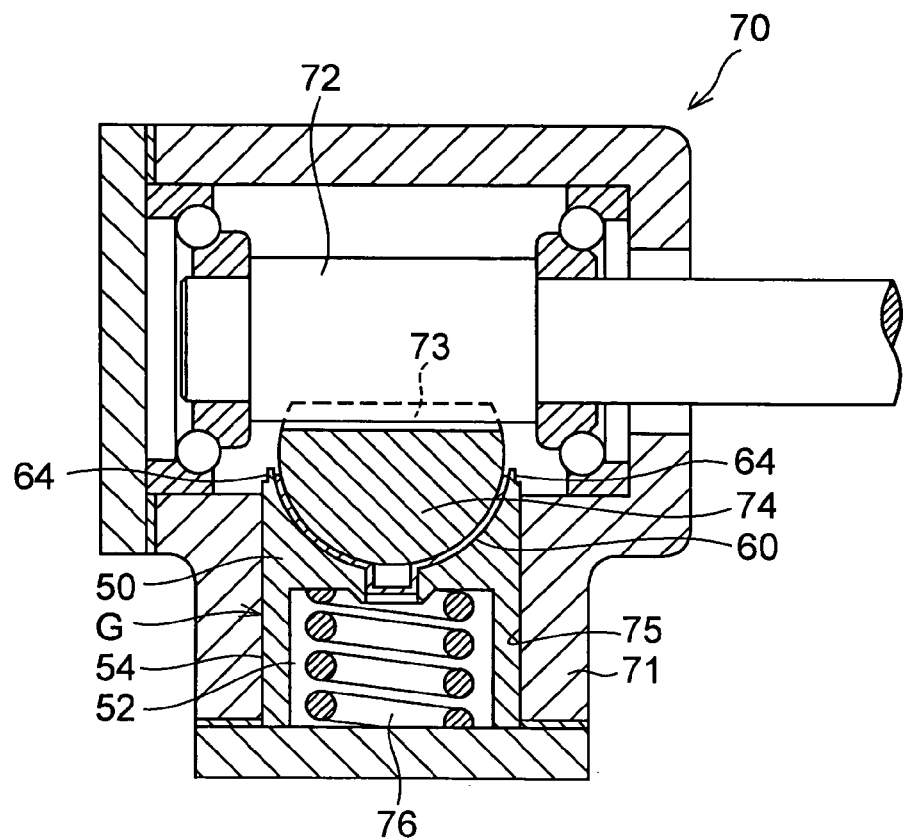
FIG. 10 is a cross-sectional view illustrating a rack-and-pinion type steering apparatus.

In a rack-and-pinion type steering apparatus 70 shown in FIG. 10, this rack guide G is accommodated in a cylindrical housing 71 so as to slidably support a rack bar 74 having rack teeth 73 formed thereon for meshing with a pinion 72 rotatably supported in the cylindrical housing 71. At this time, in the rack guide G, even if the gap which is set between the semicylindrical surface 54 at the outer peripheral surface of the rack guide base body 50 and an inner peripheral surface 75 of the cylindrical housing 71 is very small on the order of 1 to 20 µm, the cut remnants of the runners 56 at the flat surfaces 55 of the rack guide base body 50, as well as the projections at outer edges of the inclined circular arc-shaped surface edges 59 and the perpendicular circular arc-shaped surface edges 64, do not project from the phantom circle 57 defined by the semicylindrical surfaces 54. Therefore, the movement of the rack guide G by being pressed toward the rack bar 74 side by a spring 76 disposed in the cylindrical surface 52 of the rack guide G in the cylindrical housing 71 can be effected smoothly without needing to separately remove the cut remnants of the runners 56 and the projections attributable to the gap between the die 1 and the movable die 20.

In addition, in the rack guide G, since passages can be formed by the respective gaps between the pair of flat surfaces 55 and the semicylindrical housing 71, these passages can be utilized as air passages or lubricant passages for such as grease, as required.

FIGS. 11 to 14 show a method of manufacturing the rack guide base body in accordance with another embodiment. Also in this method of manufacturing the rack guide base body, it is possible to use as it is the die 1 consisting of the lower die half 1a and the upper die half 1b used in the above-described method of manufacturing the rack guide base body 50, excluding the arrangements which are described below. Hence, a description will be given by using identical reference numerals for the die 1.

In the lower die half 1a and the upper die half 1b of the embodiment, for example, one of the inclined circular arc-shaped stepped portions 14a is not directly connected to the perpendicular stepped portion 18a, but is connected to a parallel stepped portion 77a connected to the perpendicular stepped portion 18a and extending parallel to the axial direction. One of the inclined circular arc-shaped stepped portions 14b is also not directly connected to the perpendicular stepped portion 18b, but is connected to a parallel stepped portion 77b connected to the perpendicular stepped portion 18b and extending parallel to the axial direction. The other ones of the inclined circular arc-shaped stepped portions 14a and the inclined circular arc-shaped stepped portions 14b are also similar (see parallel stepped portions 89a and 89b in FIG. 14).

As the one surface 2b of the upper die half 1b is superposed on the one surface 2a of the lower die half 1a, the cylindrical hollow portion 3c, the substantially cylindrical hollow portion 5c, the cylindrical hollow portion 13c, the hollow portion 9c, the hollow portion 11c, the perpendicular stepped portion 18c, and the perpendicular stepped portion 19c are formed in the die 1 in the same way as described above (see FIG. 3).

Figure 11:
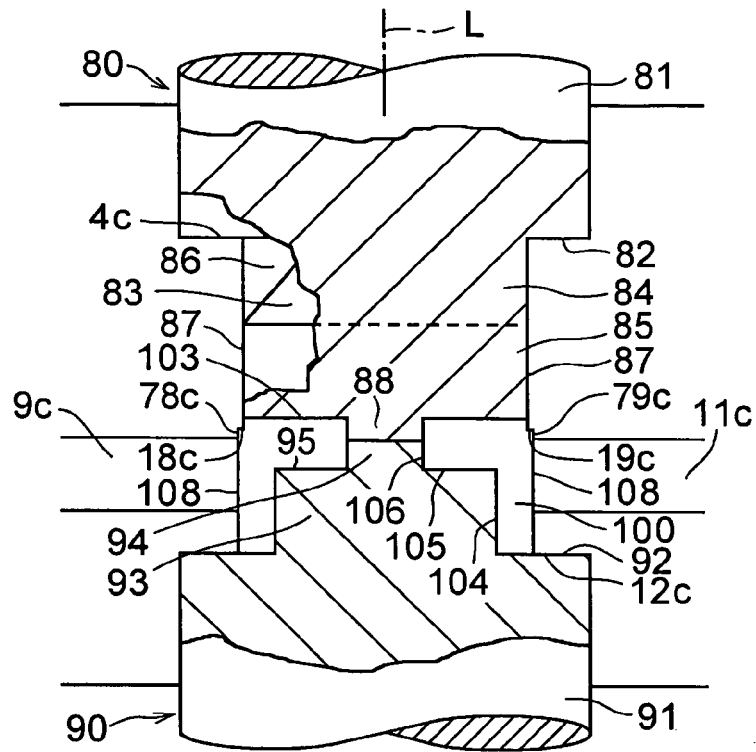
FIG. 11 is a cross-sectional view illustrating the hollow portion formed in the die.
Figure 12:
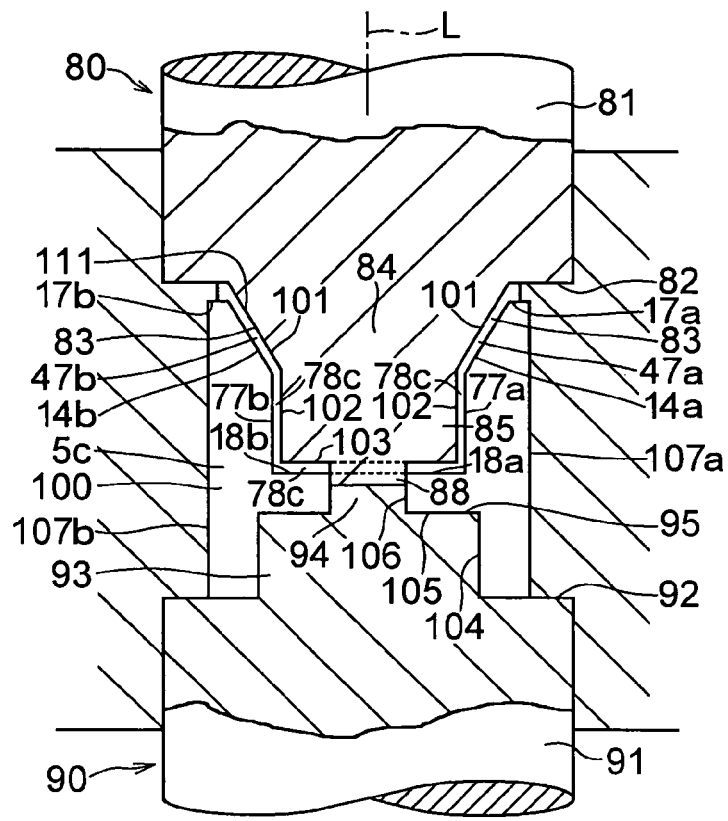
FIG. 12 is a cross-sectional view illustrating the hollow portion formed in the die.

As shown in FIGS. 11 and 12, a movable die 80 is inserted in the cylindrical hollow portion 3c. The movable die 80 has a circular cylindrical portion 81 of a shape complementary to the cylindrical hollow portion 3c; an inclined projecting portion 84; a projecting portion 85 with a rectangular cross section formed integrally on the inclined projecting portion 84; and a circular cylindrical projecting portion 88 formed integrally on a central portion of the projecting portion 85. The inclined projecting portion 84 is formed integrally on one end face of the circular cylindrical portion 81 by leaving a flat portion 82 around its peripheral edge, and has a pair of mutually opposing inclined surfaces 83 which converge from the flat portion 82 along the direction of the axis L of the circular cylindrical portion 81, such that the pair of crescent-shaped opening surfaces 36a and 36b (see FIG. 5(b)) are produced with respect to respective ones of the semicylindrical concave surfaces 5a2 and 5b2 at the opening surface of the hollow portion 5c2 communicating with the cylindrical hollow portion 3c. Both end faces of the inclined projecting portion 84 and the projecting portion 85 are respectively formed into cylindrical surfaces 86 and flat surfaces 87 which are of a shape complementary to the semicylindrical concave surfaces 5a2 and 5b2 and the flat surfaces 6a2, 6b2 and 7a2, 7b2 defining the substantially cylindrical hollow portion 5c of the die 1. The movable die 80 is inserted such that the flat portion 82 abuts against the annular stepped portion 4c of the die 1, and the inclined projecting portion 84 and the projecting portion 95 are located in the substantially cylindrical hollow portion 5c.

As shown in FIGS. 11 and 12, a movable die 90 is inserted in the cylindrical hollow portion 13c. The movable die 90 has a circular cylindrical portion 91 of a shape complementary to the cylindrical hollow portion 13c, a circular cylindrical projecting portion 93 formed integrally on one end face of the circular cylindrical portion 91 by leaving an annular flat portion 92 around its peripheral edge, and a circular cylindrical projecting portion 94 formed integrally on a central portion of an end face of the circular cylindrical projecting portion 93 by leaving an annular flat portion 95. The movable die 90 is inserted such that the flat portion 92 abuts against the annular stepped portion 12c of the die 1, the circular cylindrical projecting portion 94 abuts against an end face of the circular cylindrical projecting portion 88, and the circular cylindrical projecting portion 93 is located in the substantially cylindrical hollow portion 5c.

A cavity 100 is formed in the die 1 by means of the die 1 consisting of the lower die half 1a and the upper die half 1b as well as the movable die 80 and the movable die 90. The cavity 100 is provided with the following: a semicylindrical convex surface 107a (corresponding to the semicylindrical concave surface 5a) having at its one axial end the semicylindrical convex surface edge 47a (corresponding to the semicylindrical concave surface 5a2) located on the inner side via a pair of inclined circular arc-shaped stepped portions (corresponding to the pair of inclined circular arc-shaped stepped portions 14a) each extending in the shape of a circular arc in such a manner as to be inclined with respect to the axial direction and a perpendicular circular arc-shaped stepped portion (corresponding to the perpendicular circular arc-shaped stepped portion 17a) extending in the shape of a circular arc perpendicularly to the axial direction in such a manner as to be connected at its one end to one end of one inclined circular arc-shaped stepped portion and to be connected at its other end to one end of the other inclined circular arc-shaped stepped portion; as well as a semicylindrical convex surface 107b (corresponding to the semicylindrical concave surface 5b) having at its one axial end the semicylindrical convex surface edge 47b (corresponding to the semicylindrical concave surface 5b2) located on the inner side via a pair of inclined circular arc-shaped stepped portions (corresponding to the pair of inclined circular arc-shaped stepped portions 14b) each extending in the shape of a circular arc in such a manner as to be inclined with respect to the axial direction and a perpendicular circular arc-shaped stepped portion (corresponding to the perpendicular circular arc-shaped stepped portion 17b) extending in the shape of a circular arc perpendicularly to the axial direction in such a manner as to be connected at its one end to one end of one inclined circular arc-shaped stepped portion and to be connected at its other end to one end of the other inclined circular arc-shaped stepped portion. The cavity 100 is further provided with a pair of flat surfaces 108 (corresponding to portions of the flat surfaces 6a1, 7a1 and 6b1, 7b1 and the flat surfaces 6a2, 7a2 and 6b2, 7b2) located between the pair of semicylindrical convex surfaces 107a and 107b in such a manner as to oppose each other and having at their one axial ends flat surface edges 78c and 79c (corresponding to portions of the flat surfaces 6a2, 7a2 and 6b2, 7b2) located on the inner side via parallel stepped portions (corresponding to the parallel stepped portions 77a and 77b) extending parallel to the axial direction and connected at their one ends to the other ends of corresponding inclined circular arc-shaped stepped portions (each corresponding to either one of the pairs of the inclined circular arc-shaped stepped portions 14a and 14b) and perpendicular stepped portions (corresponding to the perpendicular stepped portions 18c and 19c) extending perpendicular to the axial direction and connected to the other ends of corresponding parallel stepped portions. The cavity 100 is further provided with a recessed surface 111 including a pair of flat surfaces 102 (corresponding to side surfaces of the projecting portion 85) located on one axial end portion side inwardly of the pair of semicylindrical convex surfaces 107 and the flat surfaces 108 and opposed to each other, a pair of inclined surfaces 101 (corresponding to the inclined surfaces 83) respectively extending integrally from the pair of flat surfaces 102, and a horizontal surface 103 (corresponding to the lower surface of the projecting portion 85) continuing from the pair of flat surfaces 102; and a cylindrical surface 104 (corresponding to an outer peripheral cylindrical surface of the circular cylindrical projecting portion 93) located on the other axial end portion side inwardly of the pair of semicylindrical convex surfaces 107a and 107b and the flat surfaces 108. The cavity 100 is further provided with a cylindrical surface 106 (corresponding to outer peripheral cylindrical surfaces of the circular cylindrical projecting portions 88 and 94) which is connected at its one end to a center of the bottom of the recessed surface 111 on the other axial end portion side, is located inwardly of the pair of semicylindrical convex surfaces 107a and 107b and the flat surfaces 108, and has a smaller diameter than the cylindrical surface 104; and an annular surface 105 (corresponding to the flat portion 95) which is connected at its inner peripheral end to the other end of the small-diameter cylindrical surface 106 and is connected at its outer peripheral end to one end of the cylindrical surface 104, the mutually opposing pair of flat surfaces 108 being connected to respective ends of the bottom of the recessed surface 111 via the flat surface edges 78c and 79c and perpendicular stepped portions (corresponding to the perpendicular stepped portions 18c and 19c). Further formed in the die 1 are the hollow portion 11c with a rectangular cross section which has one end communicating with the cavity 100 and the other end communicating with the hollow portion 10c constituting the gate, the hollow portion 11c forming a runner channel for allowing the hollow portion 10c to communicate with the cavity 100 at one flat surface 108; and the hollow portion 9c with a rectangular cross section which has one end communicating with the cavity 100 and the other end communicating with the hollow portion 8c constituting the overflow well, the hollow portion 9c forming a runner channel for allowing the hollow portion 8c to communicate with the cavity 100 at the other flat surface 108.

In addition, molten metal of such as aluminum is forced into the cavity 100 through the hollow portion 10c serving as the gate, so as to effect die casting.

With a rack guide base body 200 removed from the die 1 after die casting, in the same way as the rack guide base body 50 in the above-described embodiment, the runners 56 are integrally joined to a pair of flat surfaces 207 opposing each other at the outer peripheral surface. These runners 56 are cut off along the flat surfaces 207 at positions which do not project from a phantom circle 109 defined by a pair of semicylindrical surfaces 206 at the outer peripheral surface, thereby forming the rack guide base body 200.

Figure 13:
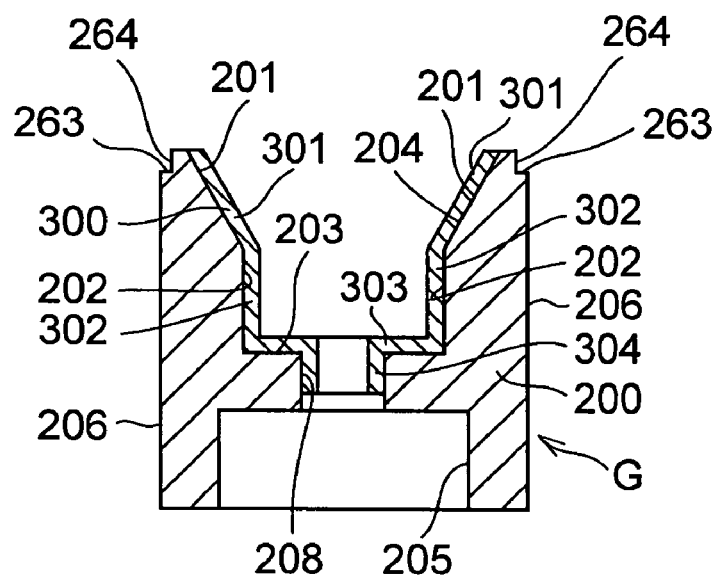
FIG. 13 is a cross-sectional view of the rack guide, as viewed in the direction of arrows along line XIII-XIII shown in FIG. 4.
Figure 14:
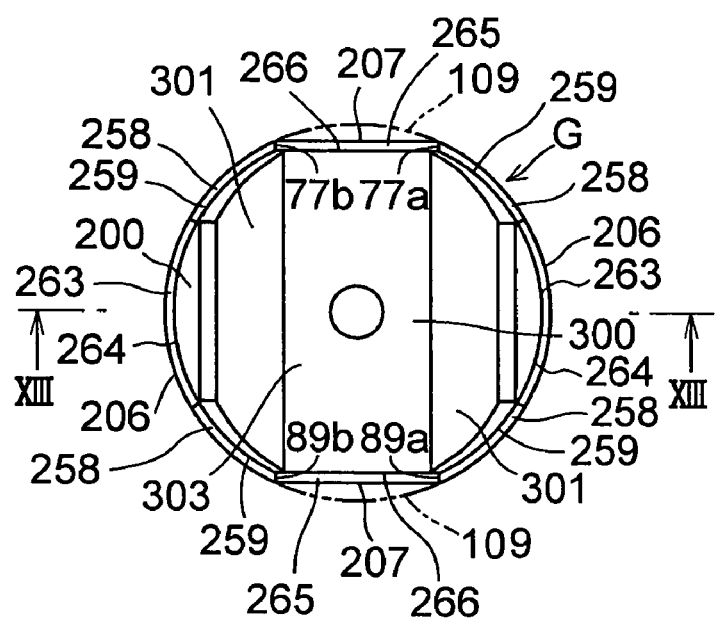
FIG. 14 is a plan view of the rack guide shown in FIG. 13.

As shown in FIGS. 13 and 14, the rack guide base body 200 thus formed of aluminum or the like has on its outer peripheral surface the pair of semicylindrical surfaces 206 and the pair of flat surfaces 207 each located between the pair of semicylindrical surfaces 206. The rack guide base body 200 is further provided with a recessed surface 204 which includes a pair of flat surfaces 202 located on one axial end portion side inwardly of the pair of semicylindrical surfaces 206 and the flat surfaces 207 and opposed to each other, a pair of inclined surfaces 201 respectively extending integrally from the pair of flat surfaces 202 and opposed to each other, and a horizontal surface 203 extending integrally from the pair of flat surfaces 202. Furthermore, the rack guide base body 200 is provided with a cylindrical surface 205 located on the other axial end portion side inwardly of the pair of semicylindrical surfaces 206 and the flat surfaces 207, and is provided with and a circular hole 208 located in the center of the bottom of the recessed surface 204. Each of the pair of semicylindrical surfaces 206 has at its one axial end a pair of inclined circular arc-shaped surface edges 259 extending in such a manner as to be inclined with respect to the axial direction and located on the inner side via a pair of stepped portions 258 (corresponding to the inclined circular arc-shaped stepped portions 14a or 14b), as well as a perpendicular circular arc-shaped surface edge 264 extending perpendicular to the axial direction and located on the inner side via a stepped portion 263 (corresponding to the perpendicular circular arc-shaped stepped portion 17a or 17b), the perpendicular circular arc-shaped surface edge 264 being connected at its one end to one end of one inclined circular arc-shaped surface edge 259 and connected at its other end to one end of the other inclined circular arc-shaped surface edge 259. Each of the flat surfaces 207 has a flat surface edge 266 (corresponding to the flat surface edge 78c or 79c) extending perpendicular to the axial direction and located on the inner side via a stepped portion 265 (corresponding to the perpendicular stepped portion 18c or 19c and the parallel stepped portions 77a, 77b, 89a, and 89b), the flat surface edge 266 being connected at its one end to the other end of one inclined circular arc-shaped surface edge 259 and connected at its other end to the other end of the other inclined circular arc-shaped surface edge 59. The pair of flat surfaces 207 is connected to the respective ends of the bottom of the recessed surface 204 via the flat surface edges 266 and the stepped portions 265, and are located in such a manner as to oppose each other.

A slider 300, which has a pair of mutually opposing inclined surface portions 301, a pair of vertical surface portions 302 continuing from the respective inclined surface portions 301, a horizontal surface portion 303 continuing from the respective vertical surface portions 302, and an engaging projection 304 serving as a projecting portion formed integrally on a reverse surface of the horizontal surface portion 303, is seated on the recessed surface 204 such that the engaging projection 304 on the reverse surface of the horizontal surface portion 303 is fitted in the hole 208 formed in the center of the horizontal surface 203 of the rack guide base body 200. Thus the rack guide G is formed by the rack guide base body 200 and the slider 300.

As the slider 300, in the same way as the above-described embodiment it is suitable to use a synthetic resin such as a polyacetal resin or a polyamide resin, or a multilayered material consisting of a steel sheet, a porous metal sintered layer deposited and formed integrally on this steel sheet, and a synthetic resin layer impregnating and coated on this porous metal sintered layer.

Also in the rack guide G shown in FIGS. 13 and 14, even if the very small gap set between the semicylindrical surface 206 at the outer peripheral surface of the rack guide G and the inner peripheral surface 75 of the cylindrical housing 71 is 1 to 20 μm, the cut remnants of the runners at the pair of flat surfaces 207 of the rack guide base body 200, as well as the projections at outer edges of the inclined circular arc-shaped surface edges 259 and the perpendicular circular arc-shaped surface edges 264, do not project from the phantom circle 109 defined by the semicylindrical surfaces 206. Therefore, the movement of the rack guide G by being pressed toward the rack bar 74 side by the spring 76 disposed in the cylindrical surface 205 of the rack guide G in the cylindrical housing 71 can be effected smoothly without needing to separately remove the cut remnants of the runners and the projections attributable to the gap between the die 1 and the movable die 80.

In addition, in the rack guide G as well, passages can be formed by gaps between the pair of flat surfaces 207 and the cylindrical housing 71, with the result that these passages can be used as air passages or lubricant passages for grease or the like, as necessary.

Figure 15:
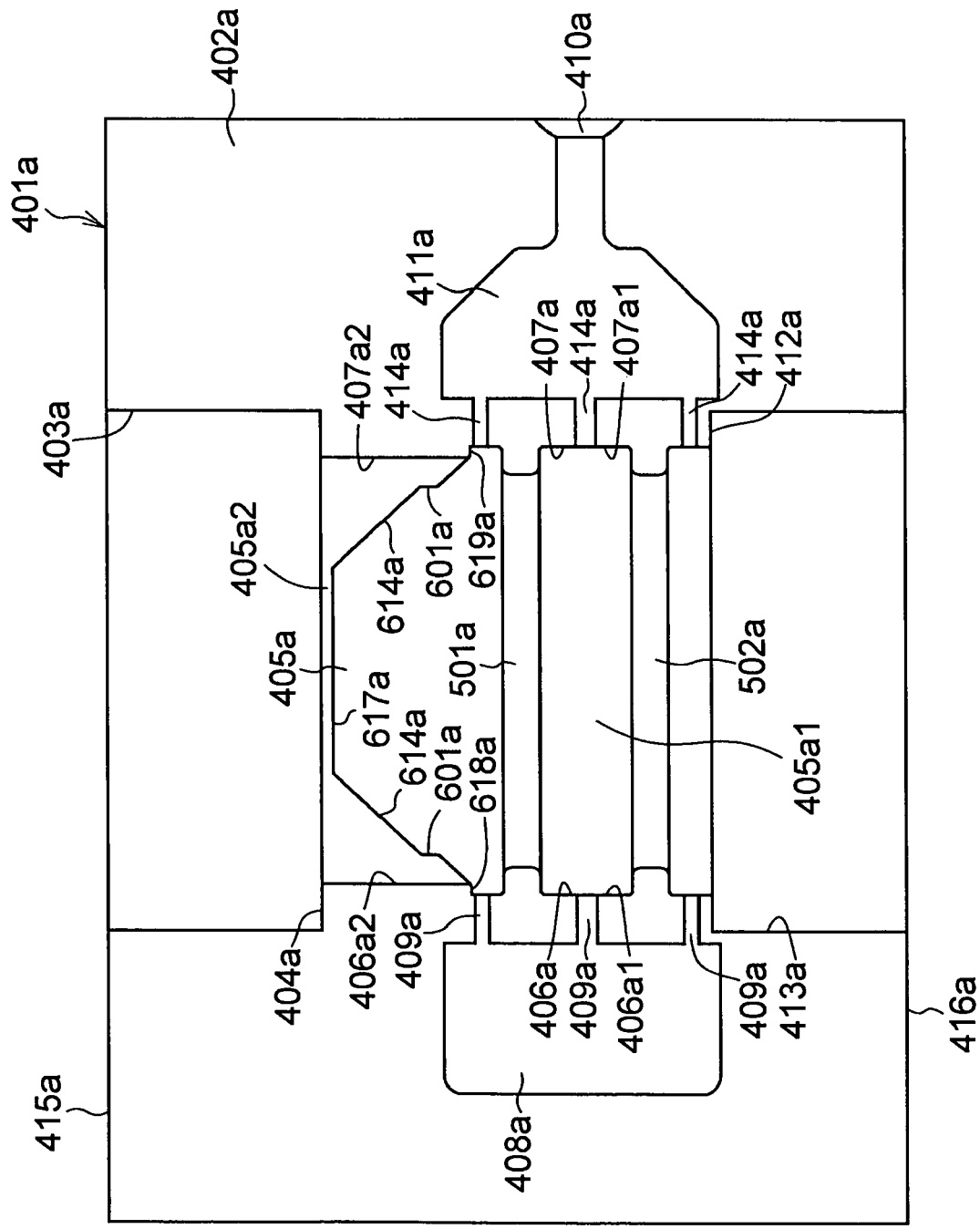
FIG. 15 is a plan view of another lower die half in the manufacturing method of the invention.
Figure 18:
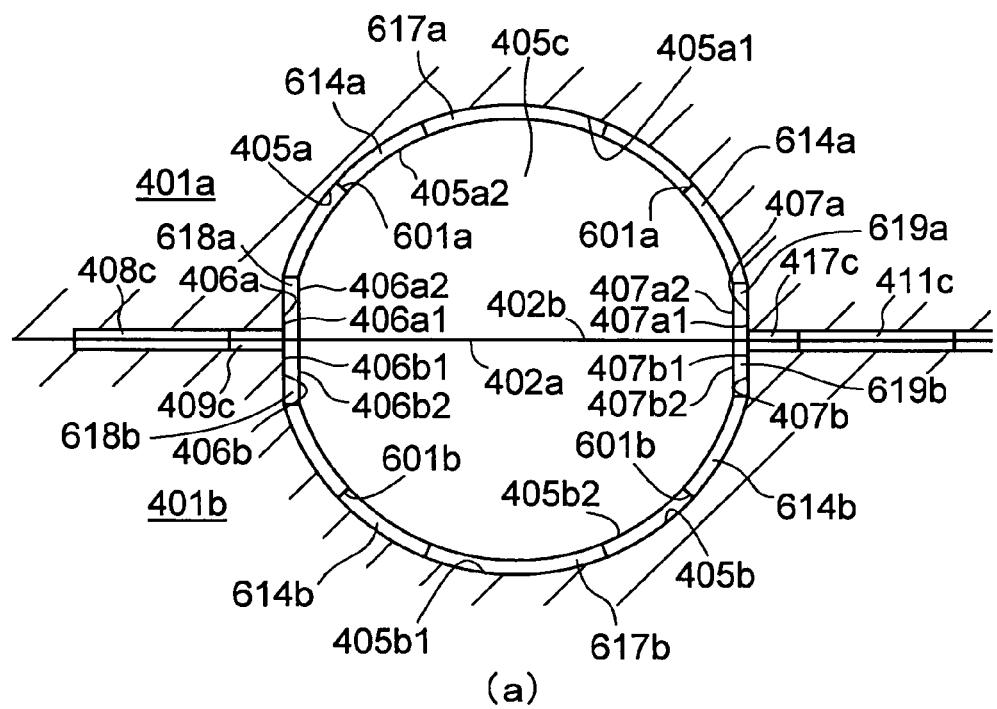
FIG. 18 is a cross-sectional view of the die shown in FIG. 17, in which the part (a) is a cross-sectional view taken in the direction of arrows along line XVIII-a-XVIII-a, and the part (b) is a cross-sectional view taken in the direction of arrows along line XVIII-b-XVIII-b.
Figure 18:
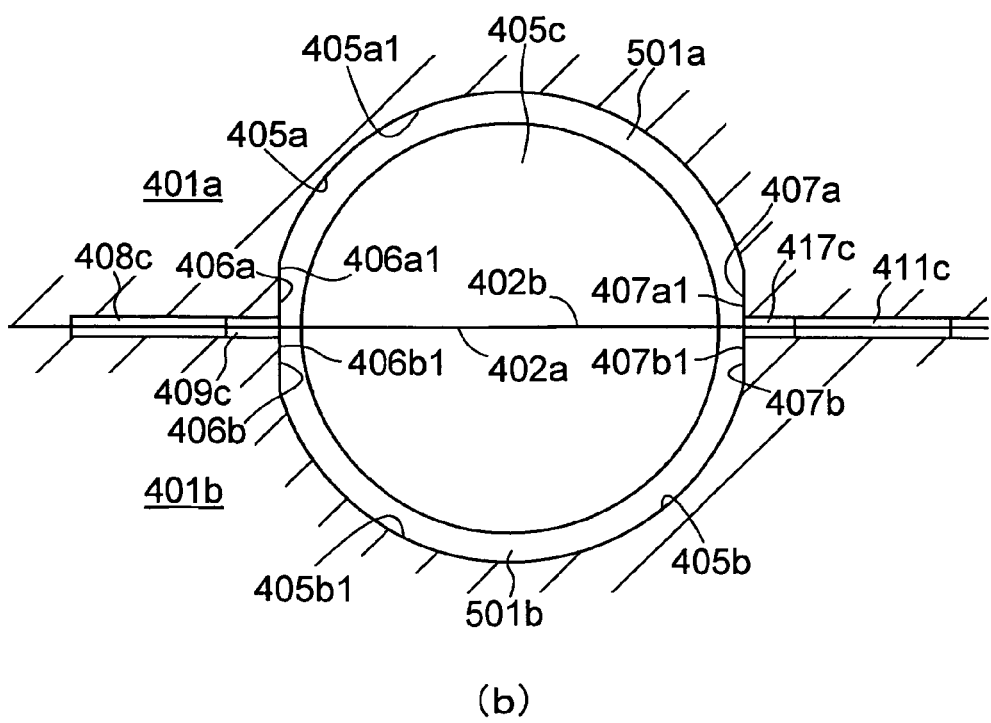

FIGS. 15 to 20 show a method of manufacturing the rack guide base body in accordance with still another embodiment. In FIGS. 15 to 20, a die 401 is formed by a lower die half 401*a* and an upper die half 401*b* which are split in two. As shown in FIGS. 15 and 18, the lower die half 401*a* is comprised of a semicylindrical concave surface 403*a* for forming a semicylindrical concave portion which is formed in one surface 402*a* and is open in one end face 415*a*; a semicylindrical concave surface 405*a* whose diameter is reduced relative to the semicylindrical concave surface 403*a* via an annular stepped portion 404*a* and which forms a semicylindrical concave portion of an intermediate portion; flat surfaces 406*a* and 407*a* formed in face-to-face relation to each other at both edges of the semicylindrical concave surface 405*a*; three recessed channels 409*a* with a rectangular cross section each having one end communicating with the flat surface 406*a* and the other end communicating with a recess 408*a* constituting the overflow well; a recessed channel 411*a* with a rectangular cross section having three branch channels 414*a* and having one end communicating with the flat surface 407*a* through the three branch channels 414*a* and the other end communicating with a recess 410*a* constituting the gate; and a semicylindrical concave surface 413*a* for forming a semicylindrical concave portion whose diameter is enlarged relative to the semicylindrical concave surface 405*a* via an annular stepped portion 412*a*, and which is open in the other end face 416*a*.

Two rows of mutually parallel semi-annular projections 501*a* and 502*a* are provided on the semicylindrical concave surface 405*a* and the flat surfaces 406*a* and 407*a*. The recessed channels 409*a* are open at the respective portions of the flat surface 406*a* separated with respect to the axial direction by the projections 501*a* and 502*a*. The branch channels 414*a* of the recessed channel 411*a* are open at the respective portions of the flat surface 407*a* separated with respect to the axial direction by the projections 501*a* and 502*a*.

The semicylindrical concave surface 405*a* has a main semicylindrical concave surface 405*a*1 whose one axial end terminates at a pair of inclined circular arc-shaped stepped portions 614*a* and a perpendicular circular arc-shaped stepped portion 617*a* and whose axial other end terminates at the annular stepped portion 412*a*, as well as an auxiliary semicylindrical concave surface 405*a*2 whose one axial end terminates at the annular stepped portion 404*a* and whose axial other end terminates at the pair of inclined circular arc-shaped stepped portions 614*a* and the perpendicular circular arc-shaped stepped portion 617*a*. Each of the inclined circular arc-shaped stepped portions 614*a* having an axially extending stepped portion 601*a* in the midway extends in the shape of a circular arc in such a manner as to be inclined with respect to the axial direction. The perpendicular circular arc-shaped stepped portion 617*a* extends in the shape of a circular arc perpendicularly to the axial direction in such a manner as to be connected at its one end to one end of one inclined circular arc-shaped stepped portion 614*a* and to be connected at its other end to one end of the other inclined circular arc-shaped stepped portion 614*a*. The semicylindrical concave surface 405*a*1, which is separated with respect to the axial direction by the two rows of parallel semi-annular projections 501*a* and 502*a*, is disposed outwardly of the semicylindrical concave surface 405*a*2 via the pair of inclined circular arc-shaped stepped portions 614*a* and the perpendicular circular arc-shaped stepped portion 617*a* excluding the portions of the projections 501*a* and 502*a*, i.e., its diameter is enlarged. The semicylindrical concave surface 405*a*2 is disposed inwardly of the semicylindrical concave surface 405*a*1 via the pair of inclined circular arc-shaped stepped portions 614*a* and the perpendicular circular arc-shaped stepped portion 617*a*, i.e., its diameter is reduced.

The flat surface 406*a* has a main flat surface 406*a*1 whose one axial end terminates at a perpendicular stepped portion 618*a* and whose axial other end terminates at the annular stepped portion 412*a*, as well as an auxiliary flat surface 406*a*2 whose one axial end terminates at the annular stepped portion 404*a* and whose axial other end terminates at the perpendicular stepped portion 618*a*. The perpendicular stepped portion 618*a* extends perpendicularly to the axial direction in such a manner as to be connected at its one end to the other end of one inclined circular arc-shaped stepped portion 614*a* and to terminate at its other end at the surface 402*a*. The flat surface 406*a*1, which is separated with respect to the axial direction by the two rows of parallel semi-annular projections 501*a* and 502*a*, is disposed outwardly of the flat surface 406*a*2 via the perpendicular stepped portion 618*a* excluding the portions of the projections 501*a* and 502*a*. The flat surface 406*a*2 is disposed inwardly of the flat surface 406*a*1 via the perpendicular stepped portion 618*a*.

In the same way as the flat surface 406*a*, the flat surface 407*a* has a main flat surface 407*a*1 whose one axial end terminates at a perpendicular stepped portion 619*a* and whose axial other end terminates at the annular stepped portion 412*a*, as well as an auxiliary flat surface 407*a*2 whose one axial end terminates at the annular stepped portion 404*a* and whose axial other end terminates at the perpendicular stepped portion 619*a*. The perpendicular stepped portion 619*a* extends perpendicularly to the axial direction in such a manner as to be connected at its one end to the other end of the other inclined circular arc-shaped stepped portion 614*a* and to terminate at its other end at the surface 402*a*. The flat surface 407*a*1, which is separated with respect to the axial direction by the two rows of parallel semi-annular projections 501*a* and 502*a*, is disposed outwardly of the flat surface 407*a*2 via the perpendicular stepped portion 619*a* excluding the portions of the projections 501*a* and 502*a*. The flat surface 407*a*2 is disposed inwardly of the flat surface 407*a*1 via the perpendicular stepped portion 619*a*.

Figure 16:
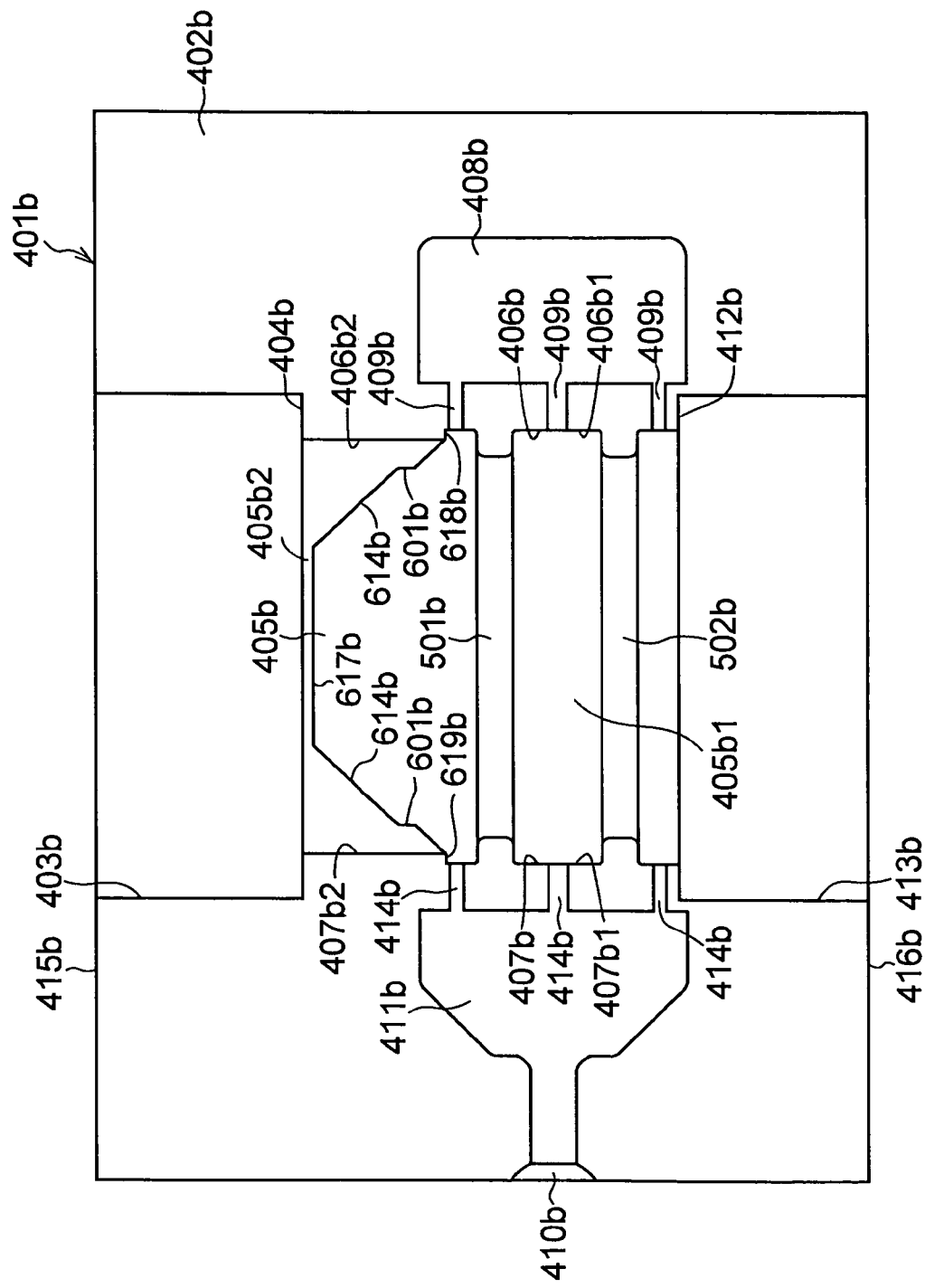
FIG. 16 is a plan view of another upper die half in the manufacturing method of the invention.
Figure 17:
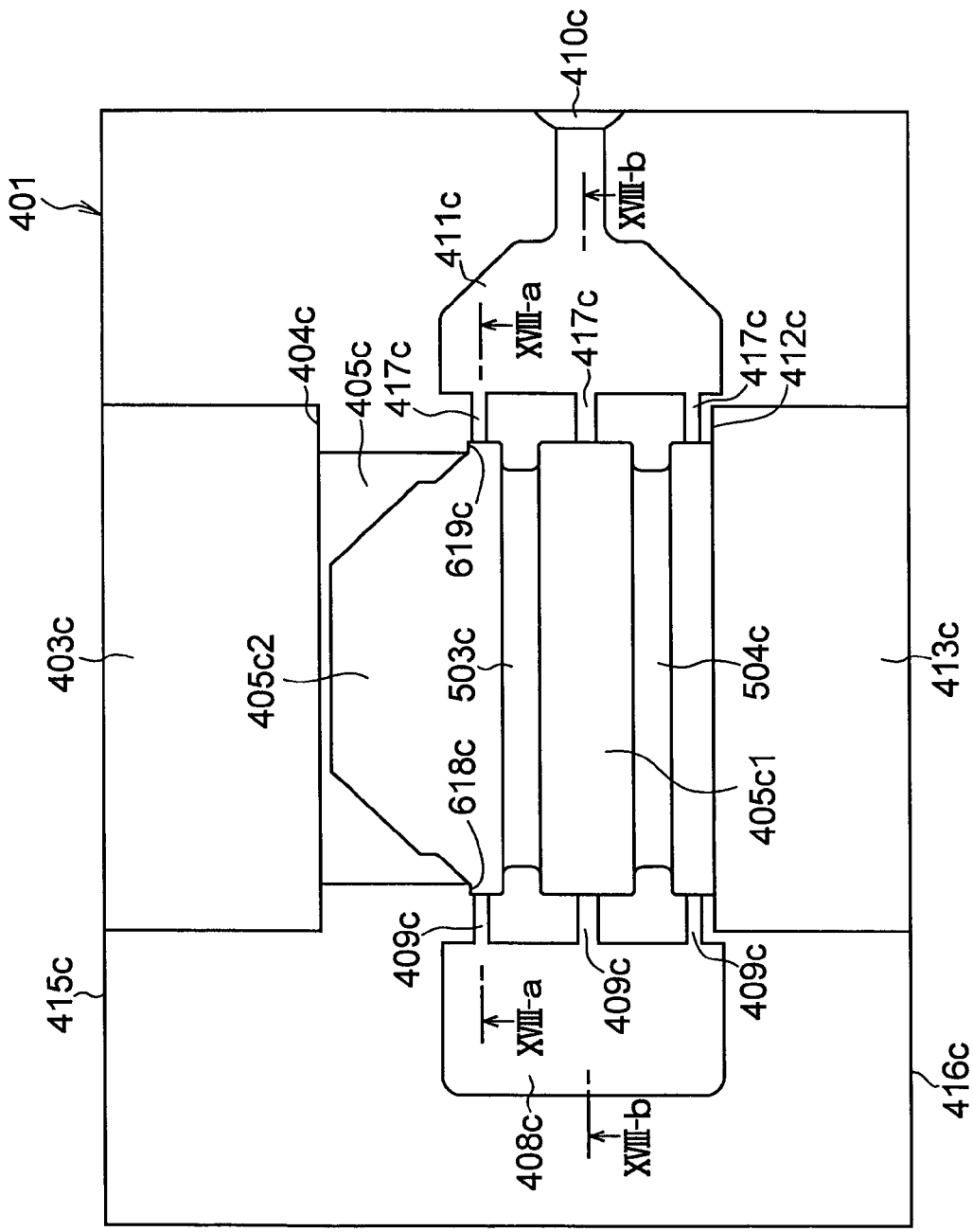
FIG. 17 is a cross-sectional view of another die in the manufacturing method of the invention.

As shown in FIGS. 16 and 18, the upper die half 401*b* is comprised of a semicylindrical concave surface 403*b* for forming a semicylindrical concave portion which is formed in one surface 402*b* and is open in one end face 415*b*; a semicylindrical concave surface 405*b* whose diameter is reduced relative to the semicylindrical concave surface 403*b* via an annular stepped portion 404*b* and which forms a semicylindrical concave portion of an intermediate portion; flat surfaces 406*b* and 407*b* formed in face-to-face relation to each other at both edges of the semicylindrical concave surface 405*b*; three recessed channels 409*b* with a rectangular cross section each having one end communicating with the flat surface 406b and the other end communicating with a recess 408b constituting the overflow well; a recessed channel 411b with a rectangular cross section having three branch channels 414b and having one end communicating with the flat surface 407b through the three branch channels 414b and the other end communicating with a recess 410b constituting the gate; and a semicylindrical concave surface 413b for forming a semicylindrical concave portion whose diameter is enlarged relative to the semicylindrical concave surface 405b via an annular stepped portion 412b, and which is open in the other end face 416b.

Two rows of mutually parallel semi-annular projections 501b and 502b are provided on the semicylindrical concave surface 405b and the flat surfaces 406b and 407b. The recessed channels 409b are open at the respective portions of the flat surface 406b separated with respect to the axial direction by the projections 501b and 502b. The branch channels 414b of the recessed channel 411b are open at the respective portions of the flat surface 407b separated with respect to the axial direction by the projections 501b and 502b.

The semicylindrical concave surface 405b has a main semicylindrical concave surface 405b1 whose one axial end terminates at a pair of inclined circular arc-shaped stepped portions 614b and a perpendicular circular arc-shaped stepped portion 617b and whose axial other end terminates at the annular stepped portion 412b, as well as an auxiliary semicylindrical concave surface 405b2 whose one axial end terminates at the annular stepped portion 404b and whose axial other end terminates at the pair of inclined circular arc-shaped stepped portions 614b and the perpendicular circular arc-shaped stepped portion 617b. Each of the inclined circular arc-shaped stepped portions 614b having an axially extending stepped portion 601b in the midway extends in the shape of a circular arc in such a manner as to be inclined with respect to the axial direction. The perpendicular circular arc-shaped stepped portion 617b extends in the shape of a circular arc perpendicularly to the axial direction in such a manner as to be connected at its one end to one end of one inclined circular arc-shaped stepped portion 614b and to be connected at its other end to one end of the other inclined circular arc-shaped stepped portion 614b. The semicylindrical concave surface 405b1, which is separated with respect to the axial direction by the two rows of parallel semi-annular projections 501b and 502b, is disposed outwardly of the semicylindrical concave surface 405b2 via the pair of inclined circular arc-shaped stepped portions 614b and the perpendicular circular arc-shaped stepped portion 617b excluding the portions of the projections 501b and 502b, i.e., its diameter is enlarged. The semicylindrical concave surface 405b2 is disposed inwardly of the semicylindrical concave surface 405b1 via the pair of inclined circular arc-shaped stepped portions 614b and the perpendicular circular arc-shaped stepped portion 617b, i.e., its diameter is reduced.

The flat surface 406b has a main flat surface 406b1 whose one axial end terminates at a perpendicular stepped portion 618b and whose axial other end terminates at the annular stepped portion 412b, as well as an auxiliary flat surface 406b2 whose one axial end terminates at the annular stepped portion 404b and whose axial other end terminates at the perpendicular stepped portion 618b. The perpendicular stepped portion 618b extends perpendicularly to the axial direction in such a manner as to be connected at its one end to the other end of one inclined circular arc-shaped stepped portion 614b and to terminate at its other end at the surface 402b. The flat surface 406b1, which is separated with respect to the axial direction by the two rows of parallel semi-annular projections 501b and 502b, is disposed outwardly of the flat surface 406b2 via the perpendicular stepped portion 618b excluding the portions of the projections 501b and 502b. The flat surface 406b2 is disposed inwardly of the flat surface 406b1 via the perpendicular stepped portion 618b.

In the same way as the flat surface 406b, the flat surface 407b has a main flat surface 407b1 whose one axial end terminates at a perpendicular stepped portion 619b and whose axial other end terminates at the annular stepped portion 412b, as well as an auxiliary flat surface 407b2 whose one axial end terminates at the annular stepped portion 404b and whose axial other end terminates at the perpendicular stepped portion 619b. The perpendicular stepped portion 619b extends perpendicularly to the axial direction in such a manner as to be connected at its one end to the other end of the other inclined circular arc-shaped stepped portion 614b and to terminate at its other end at the surface 402b. The flat surface 407b1, which is separated with respect to the axial direction by the two rows of parallel semi-annular projections 501b and 502b, is disposed outwardly of the flat surface 407b2 via the perpendicular stepped portion 619b excluding the portions of the projections 501b and 502b. The flat surface 407b2 is disposed inwardly of the flat surface 407b1 via the perpendicular stepped portion 619b.

As one surface 402b of the upper die half 401b is superposed on one surface 402a of the lower die half 401a, the following are respectively connected in flush with each other by the surfaces 2a and 2b: the respective semicylindrical concave surfaces 403a and 403b; the respective surfaces of the annular stepped portions 404a and 404b; the respective flat surfaces 406a1 and 406b1; the respective flat surfaces 406a2 and 406b2; the respective flat surfaces 407a1 and 407b1; the respective flat surfaces 407a2 and 407b2; the respective surfaces of the perpendicular stepped portions 618a and 618b; the respective surfaces of the perpendicular stepped portions 619a and 619b; the respective surfaces of the annular stepped portions 412a and 412b; the respective semicylindrical concave surfaces 413a and 413b, the respective outer surfaces of the projections 501a and 501b, and the respective outer surfaces of the projections 502a and 502b. Thus, as particularly shown in FIGS. 17 and 18, the following are formed in the die 401: a cylindrical hollow portion 403c which is open in one end face 415c formed by the end faces 415a and 415b, and is surrounded by the semicylindrical concave surfaces 403a and 403b; a substantially cylindrical hollow portion 405c whose diameter is reduced via an annular stepped portion 404c formed by the annular stepped portions 404a and 404b, and which communicates with the cylindrical hollow portion 403c and is surrounded by the semicylindrical concave surfaces 405a and 5b and the flat surfaces 406a, 407a and 406b, 407b; a cylindrical hollow portion 413c whose diameter is enlarged via an annular stepped portion 412c formed by the annular stepped portions 412a and 412b, and which communicates with the substantially cylindrical hollow portion 405c, is open in the other end face 416c formed by the end faces 416a an 416b, and is surrounded by the semicylindrical concave surfaces 413a and 413b; three hollow portions 409c with a rectangular cross section each of which has one end communicating with the substantially cylindrical hollow portion 405c at the flat surfaces 406a1 and 406b1 of the one flat surfaces 406a and 406b and the other end communicating with a hollow portion 408c constituting the overflow well and formed by the recesses 408a and 408b, the hollow portions 409c being formed by the three recessed channels 409a and the three recessed channels 409b; and a hollow portion 411c with a rectangular cross section which has three hollow branch portions 417c formed by the three branch channels 414a and the three branch channels 414b and has one end communicating with the substantially cylindrical hollow portion 405c at the other flat surfaces 407a and 407b and the other end communicating with a hollow portion 410c constituting the gate and formed by the recesses 410a and 410b, the hollow portion 411c being formed by the recessed channels 411a and 411b. Further, a straight stepped portion 618c consisting of the straight stepped portions 618a and 618b and extending straightly, as well as a straight stepped portion 619c consisting of the straight stepped portions 619a and 619b and extending straightly, are formed. Still further, in the substantially cylindrical hollow portion 405c, a reduced-diameter cylindrical hollow portion 503c is formed by the projection 501a and the projection 501b, and a reduced-diameter cylindrical hollow portion 504c is formed by the projection 502a and the projection 502b.

The substantially cylindrical hollow portion 405c consists of a main hollow portion 405c1 communicating with the cylindrical hollow portion 413c and surrounded by the semicylindrical concave surfaces 405a1 and 405b1 and the flat surfaces 406a1, 407a1, 406b1, and 407b1, as well as an auxiliary hollow portion 405c2 communicating with the cylindrical hollow portion 403c and surrounded by the semicylindrical concave surfaces 405a2 and 405b2 and the flat surfaces 406a2, 407a2, 406b2, and 407b2. The hollow portion 405c1 has the reduced-diameter cylindrical hollow portions 503c and 504c.

Figure 19:
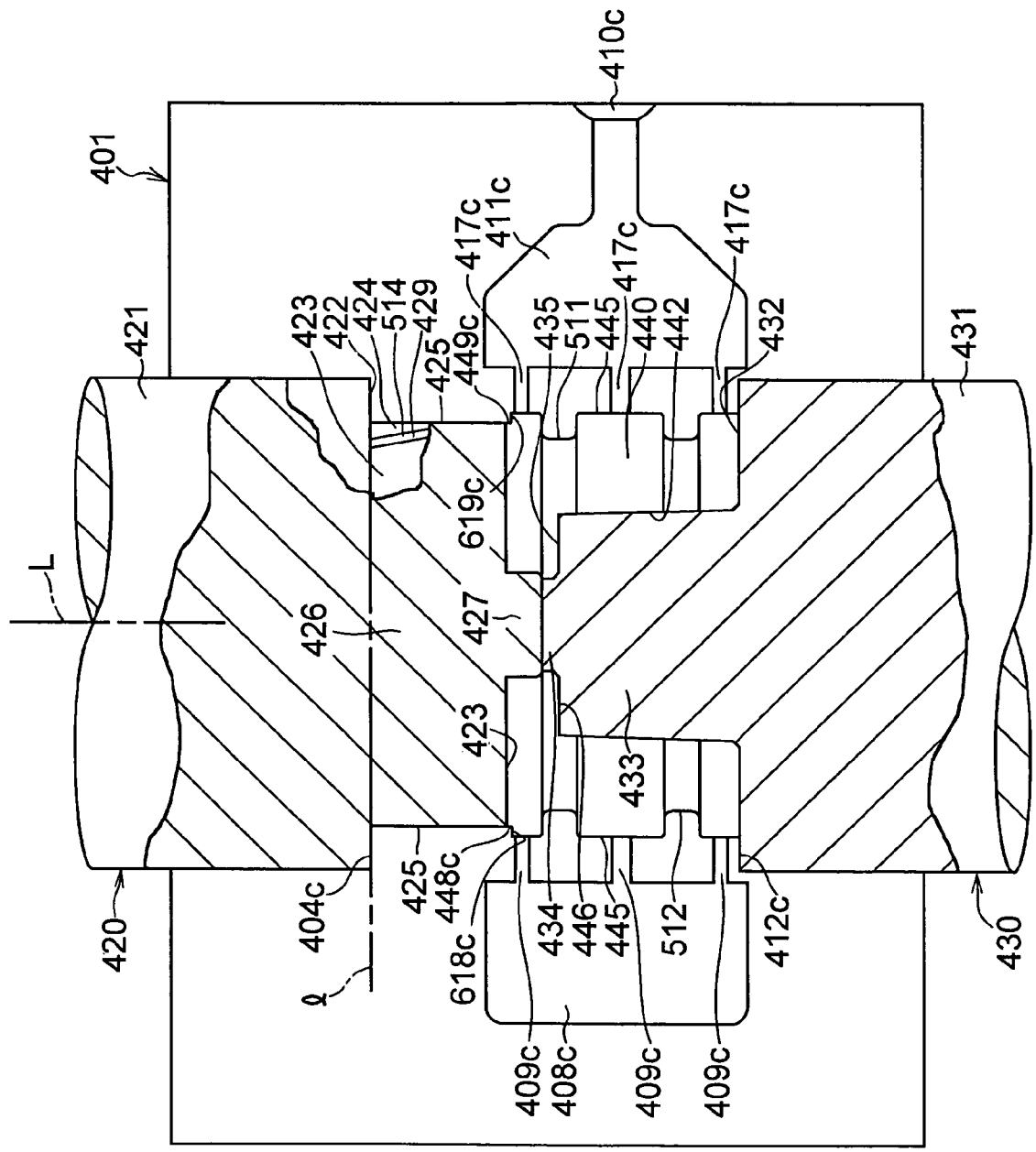
FIG. 19 is a cross-sectional view illustrating the hollow portion formed in the die shown in FIG. 17.
Figure 20:
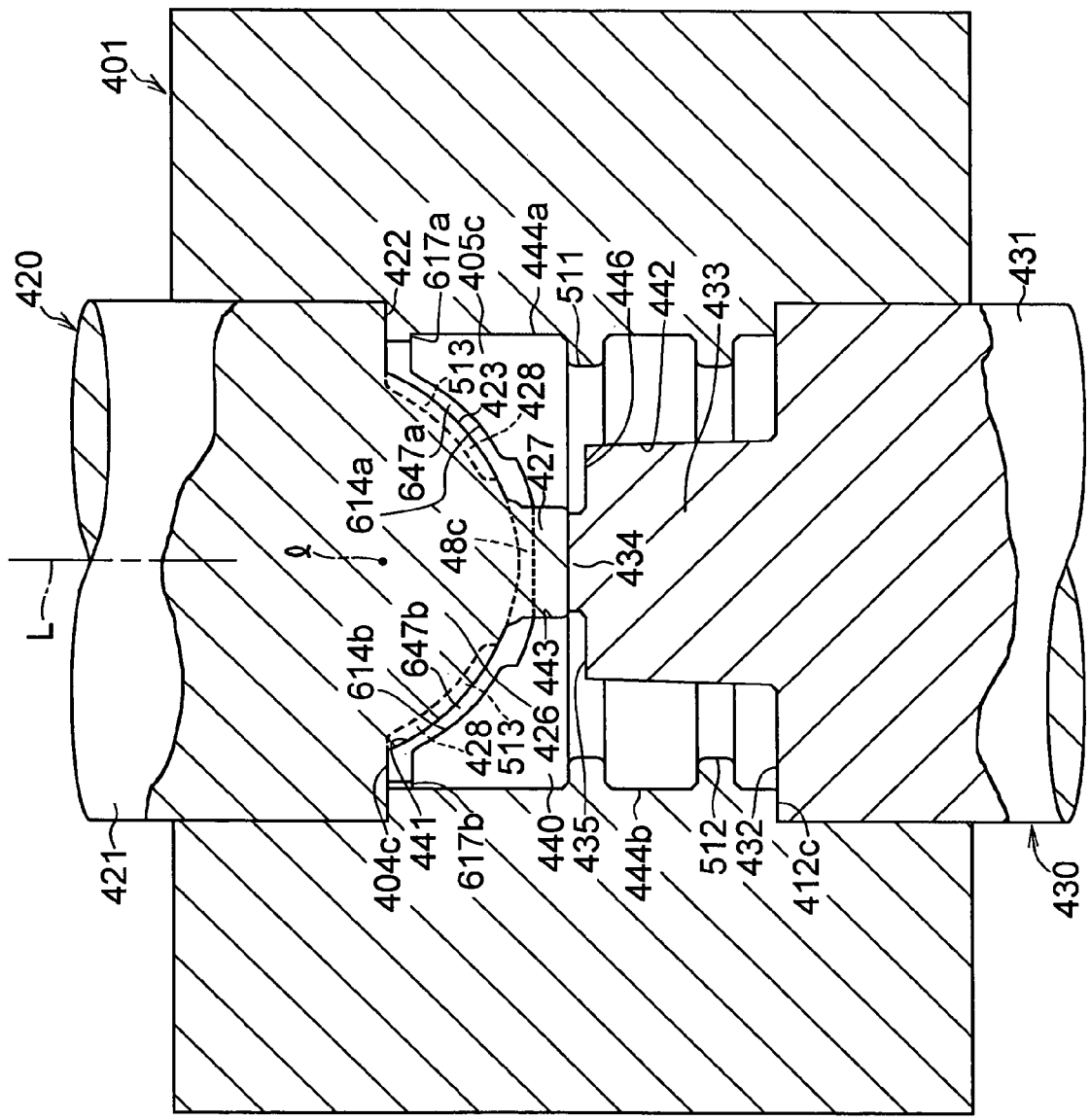
FIG. 20 is a cross-sectional view illustrating the hollow portion formed in the die shown in FIG. 17.

As particularly shown in FIGS. 19 and 20, a movable die 420 is inserted in the cylindrical hollow portion 403c of the die 401. The movable die 420 has a circular cylindrical portion 421 of a shape complementary to the cylindrical hollow portion 403c, a circular arc-shaped projecting portion 426, and a circular cylindrical projecting portion 427 formed integrally on a central portion of the circular arc-shaped projecting portion 426. The circular arc-shaped projecting portion 426 is formed integrally on one end face of the circular cylindrical portion 421 by leaving a flat portion 422 around its peripheral edge. The outer surface of the circular arc-shaped projecting portion 426 is formed into a circular arc-shaped convexly projecting surface 423 which is circular arc-shaped about the axis 1 located perpendicular to the axis L of the circular cylindrical portion 421 and at the same position as the flat portion 422 or on the cylindrical hollow portion 403c side in the axial direction. The convexly projecting surface 423 has a radius of curvature which is smaller than the radius of curvature of the semicylindrical concave surface 405a2 or 405b2 and is shorter than the distance between the annular stepped portion 404c and the perpendicular stepped portion 618c (or the perpendicular stepped portion 619c) by a length corresponding to the distance between the annular stepped portion 404a and the perpendicular circular arc-shaped stepped portion 617a (or the distance between the annular stepped portion 404b and the perpendicular circular arc-shaped stepped portion 617b), such that a pair of crescent-shaped opening surfaces (not shown, but corresponding to the opening surfaces 36a and 36b in FIG. 5) are produced at the opening surface of the hollow portion 405c2, which communicates with the cylindrical hollow portion 403c, with respect to the semicylindrical concave surfaces 405a2 and 405b2, respectively. Both end faces of the circular arc-shaped projecting portion 426 respectively have cylindrical surfaces 424 and flat surfaces 425 which are of a shape complementary to the semicylindrical concave surfaces 405a2 and 405b2 and the flat surfaces 406a2, 406b2 and 407a2, 407b2 defining the hollow portion 405c2 of the die 1. The movable die 420 further has a pair of (two pairs of on both sides) narrow-width recessed portions 428 and 429 respectively extending from vicinities of the bottom of the convexly projecting surface 423 to the apex surfaces of the convexly projecting surface 423 along edge portions on both sides, as viewed in the direction of the axis 1, of the convexly projecting surface 423 of the circular arc-shaped projecting portion 426. The movable die 420 is inserted such that the flat portion 422 abuts against the annular stepped portion 404c of the die 1, and the circular arc-shaped projecting portion 426 is located in the substantially cylindrical hollow portion 405c.

As particularly shown in FIGS. 19 and 20, a movable die 430 is inserted in the cylindrical hollow portion 413c. The movable die 430 has a circular cylindrical portion 431 of a shape complementary to the cylindrical hollow portion 413c, a circular cylindrical projecting portion 433 formed integrally on one end face of the circular cylindrical portion 431 by leaving an annular flat portion 432 around its peripheral edge, and a circular cylindrical projecting portion 434 formed integrally on a central portion of an end face of the circular cylindrical projecting portion 433 by leaving an annular flat portion 435. The movable die 430 is inserted such that the flat portion 432 abuts against the annular stepped portion 412c of the die 401, the circular cylindrical projecting portion 434 abuts against an end face of the circular cylindrical projecting portion 427, and the circular cylindrical projecting portion 433 is located in the substantially cylindrical hollow portion 405c.

A cavity 440 is formed in the die 401 by means of the die 401 consisting of the lower die half 401a and the upper die half 401b as well as the movable die 420 and the movable die 430. The cavity 440 is provided with the following: a semicylindrical convex surface 444a (corresponding to the semicylindrical concave surface 405a) having at its one axial end a semicylindrical convex surface edge 647a (corresponding to the semicylindrical concave surface 405a2) located on the inner side via a pair of inclined circular arc-shaped stepped portions (corresponding to the pair of inclined circular arc-shaped stepped portions 614a) each extending in the shape of a circular arc in such a manner as to be inclined with respect to the axial direction and a perpendicular circular arc-shaped stepped portion (corresponding to the perpendicular circular arc-shaped stepped portion 617a) extending in the shape of a circular arc perpendicularly to the axial direction in such a manner as to be connected at its one end to one end of one inclined circular arc-shaped stepped portion and to be connected at its other end to one end of the other inclined circular arc-shaped stepped portion; as well as a semicylindrical convex surface 444b (corresponding to the semicylindrical concave surface 405b) having at its one axial end a semicylindrical convex surface edge 647b (corresponding to the semicylindrical concave surface 405b2) located on the inner side via a pair of inclined circular arc-shaped stepped portions (corresponding to the pair of inclined circular arc-shaped stepped portions 614b) each extending in the shape of a circular arc in such a manner as to be inclined with respect to the axial direction and a perpendicular circular arc-shaped stepped portion (corresponding to the perpendicular circular arc-shaped stepped portion 617b) extending in the shape of a circular arc perpendicularly to the axial direction in such a manner as to be connected at its one end to one end of one inclined circular arc-shaped stepped portion and to be connected at its other end to one end of the other inclined circular arc-shaped stepped portion. The cavity 440 is further provided with a pair of flat surfaces 445 (corresponding to portions of the flat surfaces 406a1, 407a1 and 406b1, 407b1 and the flat surfaces 406a2, 407a2 and 406b2, 407b2) located between the pair of semicylindrical convex surfaces 444a and 444b in such a manner as to oppose each other and having at their one axial ends flat surface edges 448c and 449c (corresponding to portions of the flat surfaces 406a2, 407a2 and 406b2, 407b2) located on the inner side via perpendicular stepped portions (corresponding to the perpendicular stepped portions 618c and 819c) extending perpendicular to the axial direction and connected to the other ends of corresponding inclined circular arc-shaped stepped portions (each corresponding to either one of the pairs of the inclined circular arc-shaped stepped portions 614a and 614b). The cavity 440 is further provided with a circular arc-shaped recessed surface 441 (corresponding to the convexly projecting surface 423) located on one axial end portion side inwardly of the pair of semicylindrical convex surfaces 444a and 444b and the flat surfaces 445b; and a cylindrical surface 442 (corresponding to an outer peripheral cylindrical surface of the circular cylindrical projecting portion 433) located on the other axial end portion side inwardly of the pair of semicylindrical convex surfaces 444a and 444b and the flat surfaces 445. The cavity 440 is further provided with a cylindrical surface 443 (corresponding to outer peripheral cylindrical surfaces of the circular cylindrical projecting portions 427 and 434) which is connected at its one end to a center of the bottom of the concavely recessed surface 441 on the other axial end portion side, is located inwardly of the pair of semicylindrical convex surfaces 444a and 444b and the flat surfaces 445, and has a smaller diameter than the cylindrical surface 442; and an annular surface 446 (corresponding to the flat portion 435) which is connected at its inner peripheral end to the other end of the small-diameter cylindrical surface 443 and is connected at its outer peripheral end to one end of the cylindrical surface 442; two rows of semi-annular recessed portions 511 and 512 (corresponding to the projection 501a and the projection 501b as well as the projection 502a and the projection 502b) respectively provided in the pair of semicylindrical convex surfaces 444a and 444b and the pair of flat surfaces 445 at positions offset in the axial direction from the concavely recessed surface 441 toward the cylindrical surface 442 side and communicating with each other; and narrow-width protruding portions 513 and 514 (corresponding to the recessed portions 428 and 429) respectively extending from vicinities of the bottom of the concavely recessed surface 441 to the apex surfaces of the concavely recessed surface 441 along edge portions on both sides of the concavely recessed surface 441, the mutually opposing pair of flat surfaces 445 being connected to respective ends of the bottom of the concavely recessed surface 441 via the flat surface edges 448c and 449c and the perpendicular stepped portions (corresponding to the perpendicular stepped portions 618c and 619c). Further formed in the die 401 are the hollow portion 411c with a rectangular cross section which has one end communicating with the cavity 440 through the three hollow branch portions 417c constituting runner channels for communicating with the cavity 440 and the other end communicating with the hollow portion 410c, the hollow portion 411c forming a runner channel for allowing the hollow portion 410c to communicate with the cavity 440 at one flat surface 445; and the three hollow portions 409c with a rectangular cross section each of which has one end communicating with the cavity 440 and the other end communicating with the hollow portion 408c constituting the overflow well, the hollow portions 409c forming runner channels for allowing the hollow portion 408c to communicate with the cavity 440 at the other flat surface 445. The three branch hollow portions 417c of the hollow portion 411c constituting the runner channel allow the cavity 440 to communicate with the hollow portion 410c at a plurality of, in this example, three positions separated with respect to the axial direction by the semi-annular recessed portions 511 and 512 at one flat surface 445. Meanwhile, the three branch hollow portions 409c of rectangular cross sections constituting the runner channels allow the cavity 440 to communicate with the hollow portion 408c at a plurality of, in this example, three positions separated with respect to the axial direction by the recessed portions 511 and 512 at the other flat surface 445.

In addition, molten metal of such as aluminum is forced into the cavity 440 through the hollow portion 410c serving as the gate, so as to effect die casting.

Figure 21:
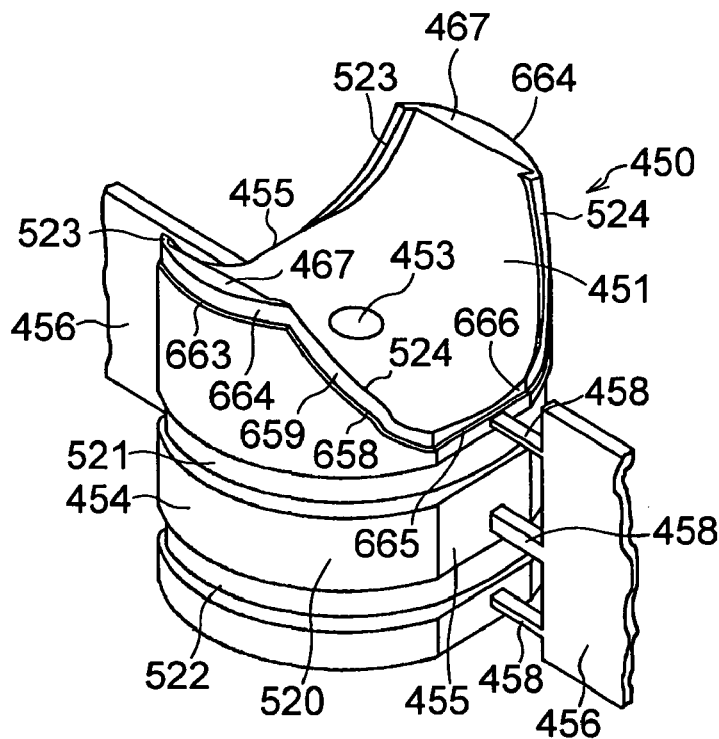
FIG. 21 is a perspective view illustrating another rack guide base body after die casting.

FIG. 21 shows a rack guide base body 450 removed from the die 401 after die casting. The rack guide base body 450 of this example has at its one axial end a pair of crescent-shaped end faces 467, and has on its outer peripheral surface a pair of semicylindrical surfaces 454 and a pair of flat surfaces 455 each located between the pair of semicylindrical surfaces 454. The rack guide base body 450 further has a circular arc-shaped concavely recessed surface 451 located on one axial end portion side inwardly of the pair of semicylindrical surfaces 454 and the flat surfaces 455; a cylindrical surface 452 (see FIG. 22) located on the other axial end portion side inwardly of the pair of semicylindrical surfaces 454 and the flat surfaces 455; and a circular hole 453 (a through hole in this example) located in the center of the bottom of the concavely recessed surface 451. Still further, the rack guide base body 450 has two mutually parallel annular grooves 521 and 522 in an outer peripheral surface 520 formed by the pair of semicylindrical surfaces 454 and the pair of flat surfaces 455, as well as narrow-width protruding portions 523 and 524 respectively extending from vicinities of the bottom of the concavely recessed surface 451 to the apex surfaces of the concavely recessed surface 451 along edge portions on both sides of the concavely recessed surface 451. Each of the pair of semicylindrical surfaces 454 has at its one axial end a pair of inclined circular arc-shaped surface edges 659 extending in such a manner as to be inclined with respect to the axial direction and located on the inner side via a pair of stepped portions 658 (corresponding to the inclined circular arc-shaped stepped portions 614a or 614b), as well as a perpendicular circular arc-shaped surface edge 664 extending perpendicular to the axial direction and located on the inner side via a stepped portion 663 (corresponding to the perpendicular circular arc-shaped stepped portion 417a or 417b), the perpendicular circular arc-shaped surface edge 664 being connected at its one end to one end of one inclined circular arc-shaped surface edge 659 and connected at its other end to one end of the other inclined circular arc-shaped surface edge 659 (the inclined circular arc-shaped surface edge 659 and the perpendicular circular arc-shaped surface edge 664 respectively correspond to the semicylindrical convex surface edges 647a and 647b). Each of the flat surfaces 455 has a flat surface edge 666 (corresponding to the flat surface edge 448c or 449c) extending perpendicular to the axial direction and located on the inner side via a stepped portion 665 (corresponding to the perpendicular stepped portion 618c or 619c), the flat surface edge 666 being connected at its one end to the other end of one inclined circular arc-shaped surface edge 659 and connected at its other end to the other end of the other inclined circular arc-shaped surface edge 659. A pair of runners 456 each having trifurcated portions 458 is integrally joined to the respective flat surfaces 455 which are connected to the respective ends of the bottom of the concavely recessed surface 451 and are located in such a manner as to oppose each other.

The rack guide base body 450 for use in the rack-and-pinion type steering apparatus is formed as the trifurcated portions 458 of the pair of runners 456 joined integrally to the flat surfaces 455 are cut off along the flat surfaces 455 at positions which do not project from the phantom circle defined by the semicylindrical surfaces 454 at the outer peripheral surface 520.

The cut remnants of the trifurcated portions 458 of the runners 456 at the flat surfaces 455 of the rack guide base body 450 can be made not to project from the phantom circle 57 defined by the semicylindrical surfaces 454 at the outer peripheral surface 520. Therefore, even with a very small gap of 1 to 20 μm set between the semicylindrical surface 454 at the outer peripheral surface 520 of the rack guide base body 450 and the inner peripheral surface 75 of the cylindrical housing 71 of the rack-and-pinion type steering apparatus where the rack guide base body 450 is disposed, it is unnecessary to separately remove the cut remnants the respective trifurcated portions of the runners 456 and effect machining for the entire outer peripheral surface 520 of the rack guide base body 450. Since the rack guide base body 450 can be disposed as die cast, it is possible to substantially reduce the cost required for machining the entire outer peripheral surface of the rack guide base body 450. As a result, this permits a reduction in the manufacturing cost of the rack guide. Moreover, the pair of semicylindrical surfaces 454 is formed on the outer peripheral surface of the rack guide base body 450. Each of the pair of semicylindrical surfaces 454 has, at its boundary with the end face 467 and the concavely recessed surface 451, the pair of inclined circular arc-shaped surface edges 659 and the perpendicular circular arc-shaped surface edge 664 which are located on the inner side via the stepped portions 658 and 663. As a result, even if slight projections attributable to the gap between the die 401 and the movable die 420 are produced at outer edges of the inclined circular arc-shaped surface edges 659 and the perpendicular circular arc-shaped surface edges 664, such projections can also be made not to project from the phantom circle defined by the semicylindrical surfaces 454 of the outer peripheral surface 520. Therefore, the rack guide base body 450 as die cast without being subjected to machining can be disposed in the cylindrical housing. In combination with the above-described effect, it is possible to substantially reduce the cost required for machining, thereby permitting a further reduction in the manufacturing cost of the rack guide.

Figure 22:
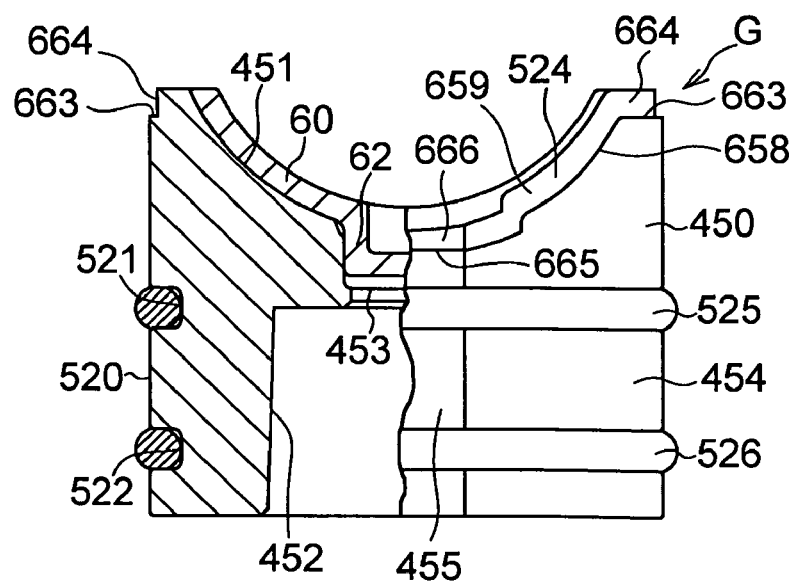
FIG. 22 is a cross-sectional view of another rack guide.

As shown in FIG. 22, in the same way as described above, the slider 60 is seated on the concavely recessed surface 451 of the rack guide base body 450 such that the engaging projection 62 is fitted in the hole 453 formed in the center of the concavely recessed surface 451 of the rack guide base body 450, and is positioned by the projecting portions 523 and 524, thereby securing the slider 60 to the rack guide base body 450. At the same time, the rack guide G is formed in which elastic rings 525 and 526 are respectively fitted in the annular grooves 521 and 522 in such a manner as to partially project from the outer peripheral surface 520 to the outside.

In the same way as described above, the rack guide G shown in FIG. 22 is accommodated in the cylindrical housing 71 in the rack-and-pinion type steering apparatus 70 shown in FIG. 10. With the rack guide G in which the elastic rings 525 and 526 are fitted, the elastic rings 525 and 526 instead of the outer peripheral surface 520 are slidably brought into contact with the inner peripheral surface 75 of the cylindrical housing 71, and are capable of producing such a necessary and sufficient gap between the outer peripheral surface 520 and the inner peripheral surface 75 that does not cause a swinging motion in the rack guide G. Thus, it is possible to prevent a so-called "metal of similar composition" which is likely to occur between the two members of the rack guide base body 450 and the cylindrical housing 71. Further, it is possible to overcome the problem that the movement of the rack guide G toward the rack bar is hampered by an increase in the frictional resistance and the occurrence of adhesive wear accompanying such a "metal of similar composition." Consequently, it becomes possible to allow the movement of the rack guide G with respect to the rack bar 74 to be effected smoothly. Moreover, even if wheel vibrations are transmitted to the rack guide G, the rack guide G is prevented from rattling with respect to the cylindrical housing 71. It is therefore possible to prevent the hammering sound of the rack guide base body 450 with respect to the inner peripheral surface 75 of the cylindrical housing 71. Furthermore, even if a force acting in a direction perpendicular to the moving direction of the rack teeth 73 has been applied to the rack teeth 73 during the steering of the steering wheel, it is possible to prevent the vertical movement, i.e., jerky movement, of the rack guide G.

Figure 23:
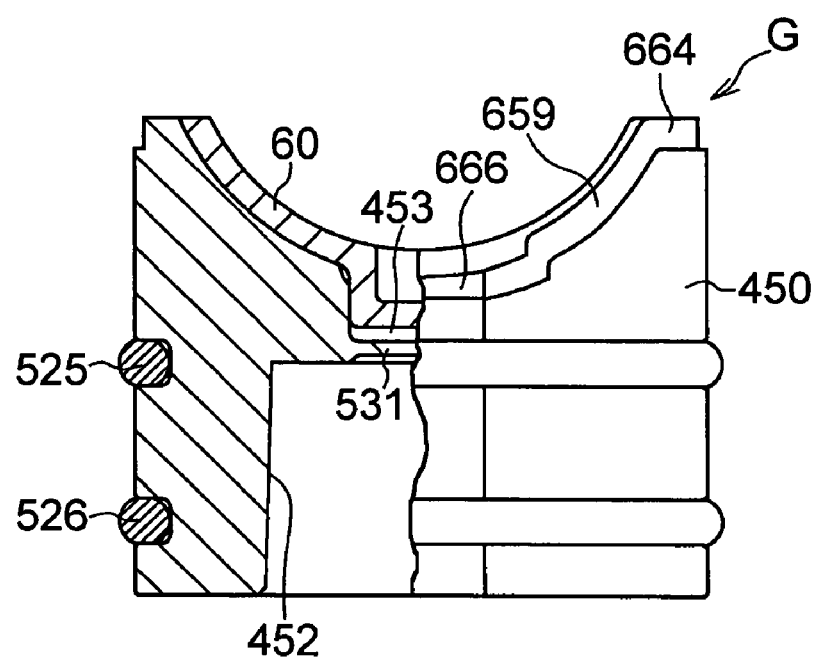
FIG. 23 is a cross-sectional view of still another rack guide.

Although in the foregoing description the hole 53 or 453 is formed as the through hole by the circular cylindrical projecting portion 27 or 427 and the circular cylindrical projecting portion 33 or 433 which abut against each other, as shown in FIG. 23, the hole 453 may be formed as a hole with a bottom closed by a bottom wall portion 531 by means of the circular cylindrical projecting portion 427 and the circular cylindrical projecting portion 433 which do not abut against each other.

It should be noted that although in the above-described embodiments, e.g., in the first embodiment, the arrangement provided is such that the flat surfaces 55 are connected to the respective ends of the bottom of the concavely recessed surface 51 via the flat surface edges 66 and the stepped portions 65, the flat surface edges 66 and the stepped portions 65 may alternatively not be provided, and the flat surfaces 55 may be directly connected to the respective ends of the bottom of the concavely recessed surface 51, and the same applies to the other embodiments as well.

The invention claimed is:

1. A method of manufacturing a rack guide base body in a rack guide consisting of a rack guide base body for use in a rack-and-pinion type steering apparatus and a slider secured to said rack guide base body, comprising the steps of:

forming in a die a cavity having a pair of semicylindrical convex surfaces each having at its one axial end a semi-cylindrical convex surface edge located on an inner side via a pair of inclined circular arc-shaped stepped portions each inclined with respect to an axial direction and extending in the shape of a circular arc and a perpendicular circular arc-shaped stepped portion perpendicular to the axial direction and extending in the shape of a circular arc in such a manner as to be connected at one end thereof to one end of one of the inclined circular arc-shaped stepped portions and to be connected at another end thereof to one end of the other one of the inclined circular arc-shaped stepped portions, said cavity further having a pair of flat surfaces each located between the pair of semicylindrical convex surfaces, a recessed surface located on one axial end portion side inwardly of the pair of semicylindrical convex surfaces and the flat surfaces, and a cylindrical surface located on another axial end portion side inwardly of the pair of semicylindrical convex surfaces and the flat surfaces;

forming runner channels for respectively allowing said cavity to communicate with a gate at one of the flat surfaces and with an overflow well at the other one of the flat surfaces;

die casting said rack guide base body by forcing molten metal of aluminum or zinc, or an aluminum alloy or a zinc alloy, from the gate into the cavity; and cutting off runners integrally joined to flat surfaces of said rack guide base body formed by the respective flat surfaces.

2. The method of manufacturing a rack guide base body according to claim 1, wherein said cavity is formed which has a circular arc-shaped recessed surface.

3. The method of manufacturing a rack guide base body according to claim 1, wherein said cavity is formed which has a recessed surface including a pair of mutually opposing flat surfaces and a pair of inclined surfaces respectively extending integrally from the pair of flat surfaces.

4. The method of manufacturing a rack guide base body according to claim 1, wherein said cavity is formed which further has a small-diameter cylindrical surface connected at one end to a center of a bottom of the recessed surface, located inwardly of the pair of semicylindrical convex surfaces and the flat surfaces, and having a diameter smaller than that of the cylindrical surface.

5. The method of manufacturing a rack guide base body according to claim 4, wherein said cavity is formed which further has an annular surface connected at its inner peripheral end to another end of the small-diameter cylindrical surface and connected at its outer peripheral end to one end of the cylindrical surface.

6. The method of manufacturing a rack guide base body according to claim 1, wherein said cavity is formed which has a pair of flat surfaces connected to respective ends of the bottom of the recessed surface and opposed to each other.

7. The method of manufacturing a rack guide base body according to claim 1, wherein said cavity is formed which has the pair of flat surfaces each having at one axial end thereof a flat surface edge located on the inner side via a perpendicular stepped portion extending perpendicular to the axial direction and connected to another end of a corresponding one of the inclined circular arc-shaped stepped portions.

8. The method of manufacturing a rack guide base body according to claim 7, wherein said cavity is formed which has the pair of flat surfaces connected to respective ends of the bottom of the recessed surface via the perpendicular stepped portions and the flat surface edges and opposed to each other.

9. The method of manufacturing a rack guide base body according to claim 1, wherein said cavity is formed which has at least one of semi-annular recessed portions communicating with each other and provided in respective ones of the pair of semicylindrical convex surfaces and the pair of flat surfaces.

10. The method of manufacturing a rack guide base body according to claim 1, wherein said cavity is formed which has at least two rows of semi-annular recessed portions communicating with each other and provided in respective ones of the pair of semicylindrical convex surfaces and the pair of flat surfaces.

11. The method of manufacturing a rack guide base body according to claim 9, wherein said cavity is formed which has semi-annular recessed portions provided in the respective ones of the pair of semicylindrical convex surfaces and the pair of flat surfaces located at positions offset in an axial direction from the recessed surface toward a side of the cylindrical surface.

12. The method of manufacturing a rack guide base body according to claim 9, wherein runner channels are formed for allowing said cavity to communicate in the one flat surface with the gate at a plurality of positions separated with respect to the axial direction by the semi-annular recessed portions and communicate in the other flat surface with the overflow well at a plurality of positions separated with respect to the axial direction by the semi-annular recessed portions.

13. The method of manufacturing a rack guide base body according to claim 1, wherein said cavity is formed which has narrow-width protruding portions extending from vicinities of the bottom of the recessed surface to apex surfaces of the recessed surface along edge portions on both sides of the recessed surface.

* * * * *